US009621376B2

(12) United States Patent
Appelman et al.

(10) Patent No.: US 9,621,376 B2
(45) Date of Patent: *Apr. 11, 2017

(54) DYNAMIC LOCATION OF A SUBORDINATE USER

(75) Inventors: Barry Appelman, New York, NY (US); Andrew Ivar Erickson, Vienna, VA (US); Larry L. Lu, Great Falls, VA (US); Robert Eugene Weltman, Los Altos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,141

(22) Filed: Jan. 30, 2012

(65) Prior Publication Data

US 2013/0031638 A1 Jan. 31, 2013

Related U.S. Application Data

(63) Continuation of application No. 11/574,831, filed as application No. PCT/US2004/029291 on Sep. 8, 2004, now Pat. No. 8,122,137.

(51) Int. Cl.
*G06F 17/30* (2006.01)
*H04L 12/58* (2006.01)
(Continued)

(52) U.S. Cl.
CPC .............. *H04L 12/581* (2013.01); *G01S 1/00* (2013.01); *G01S 19/21* (2013.01); *G01S 19/26* (2013.01);
(Continued)

(58) Field of Classification Search
CPC ....... H04L 12/581; H04L 51/04; H04L 67/26; H04L 67/306; H04L 67/24; G01S 19/21;
(Continued)

(56) References Cited

U.S. PATENT DOCUMENTS

| 4,650,927 A | 3/1987 | James |
| 4,817,129 A | 3/1989 | Riskin |

(Continued)

FOREIGN PATENT DOCUMENTS

| CA | 2547240 | 12/2009 |
| CA | 2506417 | 6/2011 |

(Continued)

OTHER PUBLICATIONS

U.S. Appl. No. 10/974,969, filed Oct. 28, 2004, 56 pages.
(Continued)

*Primary Examiner* — Kenneth R Coulter
(74) *Attorney, Agent, or Firm* — Keller Jolley Preece

(57) ABSTRACT

Providing location information to a supervisory user includes providing a parental control, using a computer automatically to determine a location of a subordinate user, and storing location information indicative of the location of the subordinate user in a database. A request of the supervisory user to locate the subordinate user is received and a user interface informs the supervisory user of the location of the subordinate user based on the stored location information. At least one of the storing and/or the informing are based on the parental control.

24 Claims, 9 Drawing Sheets

(51) Int. Cl.

| | | |
|---|---|---|
| H04L 29/08 | (2006.01) | |
| G01S 19/21 | (2010.01) | |
| G01S 19/26 | (2010.01) | |
| G01S 1/00 | (2006.01) | |
| G06F 15/16 | (2006.01) | |
| G06F 11/30 | (2006.01) | |

(52) U.S. Cl.
 CPC ............. *G06F 11/30* (2013.01); *G06F 15/16* (2013.01); *G06F 17/30* (2013.01); *H04L 51/04* (2013.01); *H04L 67/24* (2013.01); *H04L 67/26* (2013.01); *H04L 67/306* (2013.01)

(58) Field of Classification Search
 CPC . G01S 19/26; G01S 1/00; G06F 15/16; G06F 17/30; G06F 11/30
 USPC ......... 709/229, 224, 223, 217–219; 715/741, 715/738; 705/14.4–14.73
 See application file for complete search history.

(56) References Cited

U.S. PATENT DOCUMENTS

| | | | |
|---|---|---|---|
| 4,837,798 A | 6/1989 | Cohen et al. |
| 5,008,853 A | 4/1991 | Bly et al. |
| 5,021,949 A | 6/1991 | Morten et al. |
| 5,025,252 A | 6/1991 | DeLuca et al. |
| 5,086,394 A | 2/1992 | Shapira |
| 5,101,424 A | 3/1992 | Clayto et al. |
| 5,276,905 A | 1/1994 | Hurst et al. |
| 5,315,636 A | 5/1994 | Patel |
| 5,329,619 A | 7/1994 | Page et al. |
| 5,351,235 A | 9/1994 | Lahtinen |
| 5,425,028 A | 6/1995 | Britton et al. |
| 5,436,960 A | 7/1995 | Campana, Jr. et al. |
| 5,438,611 A | 8/1995 | Campana, Jr. et al. |
| 5,440,551 A | 8/1995 | Suzuki |
| 5,448,566 A | 9/1995 | Richter et al. |
| 5,448,567 A | 9/1995 | Dighe et al. |
| 5,459,458 A | 10/1995 | Richardson et al. |
| 5,479,472 A | 12/1995 | Campana, Jr. et al. |
| 5,487,100 A | 1/1996 | Kane |
| 5,491,800 A | 2/1996 | Goldsmith et al. |
| 5,497,463 A | 3/1996 | Stein et al. |
| 5,499,343 A | 3/1996 | Pettus |
| 5,548,637 A | 8/1996 | Heller |
| 5,557,320 A | 9/1996 | Krebs |
| 5,559,949 A | 9/1996 | Reimer et al. |
| 5,561,703 A | 10/1996 | Arledge et al. |
| 5,568,536 A | 10/1996 | Tiller et al. |
| 5,572,643 A | 11/1996 | Judson |
| 5,579,472 A | 11/1996 | Keyworth, II et al. |
| 5,590,133 A | 12/1996 | Billstrom et al. |
| 5,592,538 A | 1/1997 | Kosowsky et al. |
| 5,594,947 A | 1/1997 | Grube et al. |
| 5,604,788 A | 2/1997 | Tett |
| 5,608,786 A | 3/1997 | Gordon |
| 5,615,336 A | 3/1997 | Robson et al. |
| 5,619,648 A | 4/1997 | Canale et al. |
| 5,625,670 A | 4/1997 | Campana, Jr. et al. |
| 5,631,946 A | 5/1997 | Campana, Jr. et al. |
| 5,634,129 A | 5/1997 | Dickinson |
| 5,646,982 A | 7/1997 | Hogan et al. |
| 5,673,308 A | 9/1997 | Akhavan |
| 5,678,179 A | 10/1997 | Turcotte et al. |
| 5,684,494 A | 11/1997 | Nathrath et al. |
| 5,694,616 A | 12/1997 | Johnson |
| 5,697,060 A | 12/1997 | Akahane |
| 5,706,211 A | 1/1998 | Beletic et al. |
| 5,706,501 A | 1/1998 | Horikiri |
| 5,710,884 A | 1/1998 | Dedrick |
| 5,726,984 A | 3/1998 | Kubler et al. |
| 5,737,726 A | 4/1998 | Cameron et al. |
| 5,742,668 A | 4/1998 | Pepe et al. |
| 5,742,905 A | 4/1998 | Pepe et al. |
| 5,749,081 A | 5/1998 | Whiteis et al. |
| 5,760,771 A | 6/1998 | Blonder et al. |
| 5,761,196 A | 6/1998 | Ayerst et al. |
| 5,764,916 A | 6/1998 | Busey et al. |
| 5,771,280 A | 6/1998 | Johnson et al. |
| 5,774,673 A | 6/1998 | Beuk |
| 5,793,365 A | 8/1998 | Tang et al. |
| 5,793,762 A | 8/1998 | Penners et al. |
| 5,796,394 A | 8/1998 | Wicks et al. |
| 5,796,948 A | 8/1998 | Cohen |
| 5,799,157 A | 8/1998 | Escallon |
| 5,799,284 A | 8/1998 | Bourquin |
| 5,802,466 A | 9/1998 | Gallant et al. |
| 5,802,470 A | 9/1998 | Gaulke et al. |
| 5,812,865 A | 9/1998 | Theimer et al. |
| 5,819,084 A | 10/1998 | Shapiro et al. |
| 5,826,025 A | 10/1998 | Gramlich |
| 5,835,089 A | 11/1998 | Skarbo et al. |
| 5,835,722 A | 11/1998 | Bradshaw et al. |
| 5,835,905 A | 11/1998 | Pirolli et al. |
| 5,845,073 A | 12/1998 | Carlin et al. |
| 5,845,300 A | 12/1998 | Comer et al. |
| 5,864,684 A | 1/1999 | Nielsen |
| 5,864,874 A | 1/1999 | Shapiro |
| 5,867,162 A | 2/1999 | O'Leary |
| 5,870,744 A | 2/1999 | Sprague |
| 5,872,521 A | 2/1999 | Lopatukin et al. |
| 5,878,219 A | 3/1999 | Vance, Jr. et al. |
| 5,878,233 A | 3/1999 | Schloss |
| 5,878,397 A | 3/1999 | Stille et al. |
| 5,895,454 A | 4/1999 | Harrington |
| 5,896,321 A | 4/1999 | Miller et al. |
| 5,897,635 A | 4/1999 | Torres et al. |
| 5,903,726 A | 5/1999 | Donovan et al. |
| 5,913,032 A | 6/1999 | Schwartz et al. |
| 5,933,477 A | 8/1999 | Wu |
| 5,938,725 A | 8/1999 | Hara |
| 5,940,379 A | 8/1999 | Startup et al. |
| 5,940,488 A | 8/1999 | DeGrazia et al. |
| 5,944,791 A | 8/1999 | Scherpbier |
| 5,946,616 A | 8/1999 | Schornack |
| 5,946,617 A | 8/1999 | Portaro et al. |
| 5,946,629 A | 8/1999 | Sawyer et al. |
| 5,946,630 A | 8/1999 | Willars et al. |
| 5,950,193 A | 9/1999 | Kulkarni |
| 5,960,074 A | 9/1999 | Clark |
| 5,960,173 A | 9/1999 | Tang et al. |
| 5,960,429 A | 9/1999 | Peercy et al. |
| 5,961,620 A | 10/1999 | Trent et al. |
| 5,966,663 A | 10/1999 | Gleason |
| 5,970,122 A | 10/1999 | LaPorta et al. |
| 5,974,446 A | 10/1999 | Sonnenreich et al. |
| 5,978,673 A | 11/1999 | Alperovich et al. |
| 5,987,113 A | 11/1999 | James |
| 5,987,376 A | 11/1999 | Olson et al. |
| 5,999,932 A | 12/1999 | Paul |
| 6,006,331 A | 12/1999 | Chu et al. |
| 6,014,429 A | 1/2000 | LaPorta et al. |
| 6,020,884 A | 2/2000 | MacNaughton et al. |
| 6,026,429 A | 2/2000 | Jones et al. |
| 6,028,866 A | 2/2000 | Engel |
| 6,038,451 A | 3/2000 | Syed et al. |
| 6,041,311 A | 3/2000 | Chislenko et al. |
| 6,049,533 A | 4/2000 | Norman et al. |
| 6,064,723 A | 5/2000 | Cohn et al. |
| 6,065,047 A | 5/2000 | Carpenter et al. |
| 6,065,056 A | 5/2000 | Bradshaw et al. |
| 6,067,529 A | 5/2000 | Ray et al. |
| 6,067,561 A | 5/2000 | Dillon |
| 6,073,109 A | 6/2000 | Flores |
| 6,073,138 A | 6/2000 | de l'Etraz |
| 6,076,100 A | 6/2000 | Cottrille et al. |
| 6,081,829 A | 6/2000 | Sidana |
| 6,081,830 A | 6/2000 | Schindler |
| 6,088,435 A | 7/2000 | Barber |
| 6,091,948 A | 7/2000 | Carr et al. |
| 6,091,958 A | 7/2000 | Bergkvist et al. |
| 6,092,049 A | 7/2000 | Chislenko et al. |
| 6,108,365 A | 8/2000 | Rubin et al. |

(56) References Cited

U.S. PATENT DOCUMENTS

| | | | |
|---|---|---|---|
| 6,112,078 A | 8/2000 | Sormunen et al. |
| 6,112,181 A | 8/2000 | Shear |
| 6,115,455 A | 9/2000 | Picard |
| 6,115,605 A | 9/2000 | Siccardo et al. |
| 6,119,014 A | 9/2000 | Alperovich et al. |
| 6,128,739 A | 10/2000 | Fleming, III |
| 6,134,432 A | 10/2000 | Holmes et al. |
| 6,134,582 A | 10/2000 | Kennedy |
| 6,138,146 A | 10/2000 | Moon et al. |
| 6,138,158 A | 10/2000 | Boyle et al. |
| 6,141,545 A | 10/2000 | Begeja et al. |
| 6,144,959 A | 11/2000 | Anderson et al. |
| 6,148,328 A | 11/2000 | Cuomo et al. |
| 6,148,377 A | 11/2000 | Carter |
| 6,157,618 A | 12/2000 | Boss et al. |
| 6,161,129 A | 12/2000 | Rochkind |
| 6,161,130 A | 12/2000 | Horvitz et al. |
| 6,167,256 A | 12/2000 | Yla-Outinen |
| 6,169,911 B1 | 1/2001 | Wagner et al. |
| 6,175,831 B1 | 1/2001 | Weinreich et al. |
| 6,175,859 B1 | 1/2001 | Mohler |
| 6,178,331 B1 | 1/2001 | Holmes et al. |
| 6,185,603 B1 | 2/2001 | Henderson et al. |
| 6,189,026 B1 | 2/2001 | Birrell et al. |
| 6,192,396 B1 | 2/2001 | Kohler |
| 6,195,354 B1 | 2/2001 | Skalecki et al. |
| 6,198,738 B1 | 3/2001 | Chang et al. |
| 6,199,099 B1 * | 3/2001 | Gershman ......... G06F 17/30867 707/999.003 |
| 6,199,103 B1 | 3/2001 | Sakaguchi et al. |
| 6,208,996 B1 | 3/2001 | Ben-Shachar et al. |
| 6,212,175 B1 | 4/2001 | Harsch |
| 6,212,548 B1 | 4/2001 | DeSimone et al. |
| 6,212,550 B1 | 4/2001 | Segur |
| 6,223,177 B1 | 4/2001 | Tatham |
| 6,237,027 B1 | 5/2001 | Namekawa |
| 6,237,092 B1 | 5/2001 | Hayes, Jr. |
| 6,243,039 B1 | 6/2001 | Elliot |
| 6,243,714 B1 | 6/2001 | Shapiro et al. |
| 6,247,043 B1 | 6/2001 | Bates et al. |
| 6,252,952 B1 | 6/2001 | Kung et al. |
| 6,256,516 B1 | 7/2001 | Wagner et al. |
| 6,259,911 B1 | 7/2001 | Bims et al. |
| 6,260,148 B1 | 7/2001 | Aggarwal et al. |
| 6,269,369 B1 | 7/2001 | Robertson |
| 6,282,435 B1 | 8/2001 | Wagner et al. |
| 6,292,743 B1 | 9/2001 | Pu et al. |
| 6,301,609 B1 | 10/2001 | Aravamudan et al. |
| 6,304,864 B1 | 10/2001 | Liddy et al. |
| 6,311,211 B1 | 10/2001 | Shaw et al. |
| 6,324,541 B1 | 11/2001 | de l'Etraz et al. |
| 6,327,590 B1 | 12/2001 | Chidlovskii et al. |
| 6,330,590 B1 | 12/2001 | Cotten |
| 6,334,111 B1 | 12/2001 | Carrott |
| 6,337,712 B1 | 1/2002 | Shiota et al. |
| 6,343,317 B1 | 1/2002 | Glorikian |
| 6,347,332 B1 | 2/2002 | Malet |
| 6,349,299 B1 | 2/2002 | Spencer et al. |
| 6,351,777 B1 | 2/2002 | Simonoff |
| 6,360,251 B1 | 3/2002 | Fujita et al. |
| 6,363,248 B1 | 3/2002 | Silverman |
| 6,366,907 B1 | 4/2002 | Fanning |
| 6,374,246 B1 | 4/2002 | Matsuo |
| 6,374,260 B1 | 4/2002 | Hoffert et al. |
| 6,374,290 B1 | 4/2002 | Scharber |
| 6,389,127 B1 | 5/2002 | Vardi et al. |
| 6,389,372 B1 | 5/2002 | Glance et al. |
| 6,392,669 B1 | 5/2002 | Matoba et al. |
| 6,393,464 B1 | 5/2002 | Dieterman |
| 6,393,465 B2 | 5/2002 | Leeds |
| 6,396,512 B1 | 5/2002 | Nickerson |
| 6,404,438 B1 | 6/2002 | Hatlelid |
| 6,405,035 B1 | 6/2002 | Singh |
| 6,415,318 B1 | 7/2002 | Aggarwal et al. |
| 6,421,439 B1 | 7/2002 | Liffick |
| 6,421,675 B1 | 7/2002 | Ryan |
| 6,421,709 B1 | 7/2002 | McCormick et al. |
| 6,423,012 B1 | 7/2002 | Kato et al. |
| 6,425,012 B1 | 7/2002 | Trovato et al. |
| 6,430,602 B1 | 8/2002 | Kay et al. |
| 6,430,604 B1 | 8/2002 | Ogle et al. |
| 6,434,599 B1 | 8/2002 | Porter |
| 6,442,589 B1 | 8/2002 | Takahashi et al. |
| 6,442,591 B1 | 8/2002 | Haynes et al. |
| 6,446,119 B1 | 9/2002 | Olah et al. |
| 6,449,344 B1 | 9/2002 | Goldfinger et al. |
| 6,449,634 B1 | 9/2002 | Capiel |
| 6,457,044 B1 | 9/2002 | Iwazaki |
| 6,457,062 B1 | 9/2002 | Pivowar |
| 6,460,073 B1 | 10/2002 | Asakura |
| 6,463,464 B1 | 10/2002 | Lazaridis et al. |
| 6,463,471 B1 | 10/2002 | Dreke et al. |
| 6,466,918 B1 | 10/2002 | Spiegel et al. |
| 6,480,885 B1 | 11/2002 | Olivier |
| 6,483,913 B1 | 11/2002 | Smith |
| 6,484,196 B1 | 11/2002 | Maurille |
| 6,487,583 B1 | 11/2002 | Harvey et al. |
| 6,487,584 B1 | 11/2002 | Bunney |
| 6,493,703 B1 | 12/2002 | Knight et al. |
| 6,499,053 B1 | 12/2002 | Marquette |
| 6,505,167 B1 | 1/2003 | Horvitz et al. |
| 6,507,866 B1 | 1/2003 | Barchi |
| 6,512,570 B2 | 1/2003 | Garfinkle et al. |
| 6,512,930 B2 | 1/2003 | Sandegren |
| 6,519,629 B2 | 2/2003 | Harvey et al. |
| 6,519,639 B1 | 2/2003 | Glasser et al. |
| 6,519,648 B1 | 2/2003 | Eyal |
| 6,529,903 B2 | 3/2003 | Smith et al. |
| 6,535,228 B1 | 3/2003 | Bandaru et al. |
| 6,535,586 B1 | 3/2003 | Cloutier et al. |
| 6,539,421 B1 | 3/2003 | Appelman et al. |
| 6,542,500 B1 | 4/2003 | Gerszberg et al. |
| 6,549,933 B1 | 4/2003 | Barrett et al. |
| 6,549,937 B1 | 4/2003 | Auerbach et al. |
| 6,557,027 B1 | 4/2003 | Cragun |
| 6,564,213 B1 | 5/2003 | Ortega et al. |
| 6,564,261 B1 | 5/2003 | Gudjonsson et al. |
| 6,564,264 B1 | 5/2003 | Creswell et al. |
| 6,567,796 B1 | 5/2003 | Yost et al. |
| 6,567,807 B1 | 5/2003 | Robles |
| 6,571,234 B1 | 5/2003 | Knight et al. |
| 6,583,799 B1 | 6/2003 | Manolis et al. |
| 6,584,494 B1 | 6/2003 | Manabe et al. |
| 6,594,673 B1 | 7/2003 | Smith et al. |
| 6,604,133 B2 | 8/2003 | Aggarwal et al. |
| 6,606,647 B2 | 8/2003 | Shah et al. |
| 6,606,657 B1 | 8/2003 | Zilberstein et al. |
| 6,611,822 B1 | 8/2003 | Beams |
| 6,615,237 B1 | 9/2003 | Kyne et al. |
| 6,615,241 B1 | 9/2003 | Miller et al. |
| 6,618,747 B1 | 9/2003 | Flynn et al. |
| 6,625,423 B1 | 9/2003 | Wang |
| 6,628,194 B1 | 9/2003 | Hellebust et al. |
| 6,633,630 B1 | 10/2003 | Owens et al. |
| 6,636,733 B1 | 10/2003 | Helferich |
| 6,636,850 B2 | 10/2003 | Lepien |
| 6,636,888 B1 | 10/2003 | Bookspan et al. |
| 6,640,218 B1 | 10/2003 | Golding |
| 6,640,223 B1 | 10/2003 | Jones et al. |
| 6,643,641 B1 | 11/2003 | Snyder |
| 6,643,669 B1 | 11/2003 | Novak et al. |
| 6,647,259 B1 | 11/2003 | Boyle et al. |
| 6,647,383 B1 | 11/2003 | August et al. |
| 6,654,800 B1 | 11/2003 | Rieger, III |
| 6,658,095 B1 | 12/2003 | Yoakum et al. |
| 6,658,260 B2 | 12/2003 | Knotts |
| 6,665,676 B2 | 12/2003 | Twig et al. |
| 6,665,715 B1 | 12/2003 | Houri |
| 6,677,968 B1 | 1/2004 | Appelman |
| 6,678,719 B1 | 1/2004 | Stimmel |
| 6,684,240 B1 | 1/2004 | Goddard |
| 6,687,362 B1 | 2/2004 | Lindquist et al. |
| 6,687,739 B2 | 2/2004 | Anupam |
| 6,687,745 B1 | 2/2004 | Franco et al. |

(56) References Cited

U.S. PATENT DOCUMENTS

| | | | |
|---|---|---|---|
| 6,691,162 | B1 | 2/2004 | Wick |
| 6,694,353 | B2 | 2/2004 | Sommerer |
| 6,697,807 | B2 | 2/2004 | McGeachie |
| 6,697,824 | B1 | 2/2004 | Bowman-Amuah |
| 6,697,840 | B1 | 2/2004 | Godefroid |
| 6,699,125 | B2 | 3/2004 | Kirmse et al. |
| 6,701,343 | B1 | 3/2004 | Kenyon |
| 6,701,348 | B2 | 3/2004 | Sommerer |
| 6,701,351 | B1 | 3/2004 | Gann |
| 6,704,727 | B1 | 3/2004 | Kravets |
| 6,708,205 | B2 | 3/2004 | Sheldon et al. |
| 6,711,565 | B1 | 3/2004 | Subramaniam et al. |
| 6,714,519 | B2 | 3/2004 | Luzzatti et al. |
| 6,714,791 | B2 | 3/2004 | Friedman |
| 6,714,793 | B1 | 3/2004 | Carey et al. |
| 6,721,784 | B1 | 4/2004 | Leonard et al. |
| 6,728,357 | B2 | 4/2004 | O'Neal et al. |
| 6,731,308 | B1 | 5/2004 | Tang et al. |
| 6,732,103 | B1 | 5/2004 | Strick et al. |
| 6,732,155 | B2 | 5/2004 | Meek |
| 6,732,185 | B1 | 5/2004 | Reistad |
| 6,750,881 | B1 | 6/2004 | Appelman |
| 6,751,603 | B1 | 6/2004 | Bauer et al. |
| 6,754,904 | B1 | 6/2004 | Cooper et al. |
| 6,757,365 | B1 | 6/2004 | Bogard |
| 6,757,531 | B1 | 6/2004 | Haaramo |
| 6,760,412 | B1 | 7/2004 | Loucks |
| 6,760,580 | B2 | 7/2004 | Robinson et al. |
| 6,760,753 | B1 | 7/2004 | Ohgushi et al. |
| 6,760,754 | B1 | 7/2004 | Isaacs et al. |
| 6,772,188 | B1 | 8/2004 | Cloutier |
| 6,781,608 | B1 | 8/2004 | Crawford |
| 6,782,414 | B1 | 8/2004 | Xue et al. |
| 6,785,554 | B1 | 8/2004 | Amerga |
| 6,788,769 | B1 | 9/2004 | Waites |
| 6,799,039 | B2 | 9/2004 | Wu et al. |
| 6,800,031 | B2 | 10/2004 | Di Cesare |
| 6,801,659 | B1 | 10/2004 | O'Dell |
| 6,807,562 | B1 | 10/2004 | Pennock et al. |
| 6,816,884 | B1 | 11/2004 | Summers |
| 6,829,607 | B1 | 12/2004 | Tafoya et al. |
| 6,832,245 | B1 | 12/2004 | Isaacs et al. |
| 6,839,554 | B2 | 1/2005 | McDowell |
| 6,839,735 | B2 | 1/2005 | Wong et al. |
| 6,839,737 | B1 | 1/2005 | Friskel |
| 6,848,008 | B1 | 1/2005 | Sevanto et al. |
| 6,848,542 | B2 | 2/2005 | Gailey et al. |
| 6,853,982 | B2 | 2/2005 | Smith et al. |
| 6,854,007 | B1 | 2/2005 | Hammond |
| 6,856,999 | B2 | 2/2005 | Flanagin et al. |
| 6,868,498 | B1 | 3/2005 | Katsikas |
| 6,895,426 | B1 | 5/2005 | Cortright et al. |
| 6,898,626 | B2 | 5/2005 | Ohashi |
| 6,901,398 | B1 | 5/2005 | Horvitz et al. |
| 6,901,559 | B1 | 5/2005 | Blum |
| 6,904,026 | B1 | 6/2005 | Tarnanen et al. |
| 6,907,243 | B1 | 6/2005 | Patel |
| 6,912,505 | B2 | 6/2005 | Linden et al. |
| 6,912,563 | B1 | 6/2005 | Parker et al. |
| 6,912,564 | B1 | 6/2005 | Appelman et al. |
| 6,917,813 | B2 | 7/2005 | Elizondo |
| 6,917,965 | B1 | 7/2005 | Gupta et al. |
| 6,920,478 | B2 | 7/2005 | Mendiola et al. |
| 6,925,469 | B2 | 8/2005 | Headings et al. |
| 6,931,419 | B1 | 8/2005 | Lindquist |
| 6,934,367 | B1 | 8/2005 | LaPierre et al. |
| 6,952,805 | B1 | 10/2005 | Tafoya et al. |
| 6,957,077 | B2 | 10/2005 | Dehlin |
| 6,985,943 | B2 | 1/2006 | Deryugin et al. |
| 6,990,628 | B1 | 1/2006 | Palmer et al. |
| 6,993,325 | B1 | 1/2006 | Waesterlid |
| 6,999,566 | B1 | 2/2006 | Eason et al. |
| 6,999,959 | B1 | 2/2006 | Lawrence et al. |
| 7,003,551 | B2 | 2/2006 | Malik |
| 7,003,794 | B2 | 2/2006 | Arye |
| 7,007,008 | B2 | 2/2006 | Goel et al. |
| 7,007,228 | B1 | 2/2006 | Carro |
| 7,010,312 | B1 | 3/2006 | Zechlin |
| 7,016,978 | B2 | 3/2006 | Malik et al. |
| 7,020,849 | B1 | 3/2006 | Chen |
| 7,031,961 | B2 | 4/2006 | Pitkow et al. |
| 7,032,007 | B2 | 4/2006 | Fellenstein et al. |
| 7,035,865 | B2 | 4/2006 | Doss et al. |
| 7,035,926 | B1 | 4/2006 | Cohen et al. |
| 7,039,639 | B2 | 5/2006 | Brezin et al. |
| 7,054,918 | B2 | 5/2006 | Polcyn |
| 7,058,036 | B1 | 6/2006 | Yu et al. |
| 7,058,690 | B2 | 6/2006 | Maehiro |
| 7,058,892 | B1 | 6/2006 | MacNaughton et al. |
| 7,062,533 | B2 | 6/2006 | Brown et al. |
| 7,065,186 | B1 | 6/2006 | Myers et al. |
| 7,068,769 | B1 | 6/2006 | Weaver et al. |
| 7,076,504 | B1 | 7/2006 | Handel |
| 7,076,546 | B1 | 7/2006 | Bates et al. |
| 7,080,139 | B1 | 7/2006 | Briggs et al. |
| 7,082,407 | B1 | 7/2006 | Bezos et al. |
| 7,089,237 | B2 | 8/2006 | Turnbull et al. |
| 7,089,287 | B2 | 8/2006 | Bellotti et al. |
| 7,092,952 | B1 | 8/2006 | Wilens |
| 7,092,998 | B2 | 8/2006 | Frietas |
| 7,096,009 | B2 | 8/2006 | Mousseau et al. |
| 7,096,030 | B2 | 8/2006 | Huomo |
| 7,096,214 | B1 | 8/2006 | Bharat et al. |
| 7,113,803 | B2 | 9/2006 | Dehlin |
| 7,117,254 | B2 | 10/2006 | Lunt et al. |
| 7,124,123 | B1 | 10/2006 | Roskind et al. |
| 7,127,232 | B2 | 10/2006 | O'Neil et al. |
| 7,130,956 | B2 | 10/2006 | Rao |
| 7,133,506 | B1 | 11/2006 | Smith |
| 7,133,898 | B1 | 11/2006 | Malik |
| 7,136,903 | B1 | 11/2006 | Phillips et al. |
| 7,139,806 | B2 | 11/2006 | Hayes et al. |
| 7,142,642 | B2 | 11/2006 | McClelland et al. |
| 7,146,404 | B2 | 12/2006 | Kay et al. |
| 7,146,416 | B1 | 12/2006 | Yoo et al. |
| 7,162,528 | B1 | 1/2007 | Simonoff |
| 7,177,880 | B2 | 2/2007 | Ruvolo |
| 7,181,498 | B2 | 2/2007 | Zhu et al. |
| 7,185,059 | B2 | 2/2007 | Daniell et al. |
| 7,188,143 | B2 | 3/2007 | Szeto |
| 7,188,153 | B2 | 3/2007 | Lunt et al. |
| 7,190,956 | B2 | 3/2007 | Dorenbosch et al. |
| 7,194,516 | B2 | 3/2007 | Giacobbe et al. |
| 7,200,634 | B2 | 4/2007 | Mendiola et al. |
| 7,203,507 | B2 | 4/2007 | Smith et al. |
| 7,206,814 | B2 | 4/2007 | Kirsch |
| 7,212,617 | B2 | 5/2007 | Owens et al. |
| 7,218,921 | B2 | 5/2007 | Mendiola et al. |
| 7,222,309 | B2* | 5/2007 | Chupin et al. ............... 715/848 |
| 7,231,428 | B2 | 6/2007 | Teague |
| 7,231,478 | B2 | 6/2007 | Leijten |
| 7,237,002 | B1 | 6/2007 | Estrada |
| 7,237,011 | B1 | 6/2007 | St. Pierre |
| 7,240,093 | B1 | 7/2007 | Danieli et al. |
| 7,246,371 | B2 | 7/2007 | Diacakis et al. |
| 7,257,639 | B1 | 8/2007 | Li et al. |
| 7,269,590 | B2 | 9/2007 | Hull et al. |
| 7,269,627 | B2 | 9/2007 | Knauerhase |
| 7,275,215 | B2 | 9/2007 | Werndorfer et al. |
| 7,297,110 | B2 | 11/2007 | Goyal et al. |
| 7,299,257 | B2 | 11/2007 | Boyer et al. |
| 7,305,624 | B1 | 12/2007 | Siegel |
| 7,313,760 | B2 | 12/2007 | Grossman |
| 7,319,882 | B2 | 1/2008 | Mendiola et al. |
| 7,324,826 | B2 | 1/2008 | Carey et al. |
| 7,337,219 | B1 | 2/2008 | Meenan et al. |
| 7,366,522 | B2 | 4/2008 | Thomas |
| 7,370,035 | B2 | 5/2008 | Gross et al. |
| 7,380,268 | B2 | 5/2008 | Challener et al. |
| 7,383,339 | B1 | 6/2008 | Meenan et al. |
| 7,401,098 | B2 | 7/2008 | Baker |
| 7,403,942 | B1 | 7/2008 | Bayliss |
| 7,406,715 | B2* | 7/2008 | Clapper ............... 726/25 |
| 7,411,939 | B1 | 8/2008 | Lamb et al. |

(56) References Cited

U.S. PATENT DOCUMENTS

| | | | |
|---|---|---|---|
| 7,424,510 B2 | 9/2008 | Gross et al. |
| 7,428,580 B2 | 9/2008 | Hullfish et al. |
| 7,428,585 B1 | 9/2008 | Owens et al. |
| 7,475,113 B2 | 1/2009 | Stolze |
| 7,478,414 B1 | 1/2009 | Glusker et al. |
| 7,499,973 B2 | 3/2009 | Couts et al. |
| 7,512,407 B2 | 3/2009 | Wu et al. |
| 7,543,243 B2 | 6/2009 | Schwartz et al. |
| 7,552,460 B2 | 6/2009 | Goldman |
| 7,590,696 B1 | 9/2009 | Odell |
| 7,603,417 B2 | 10/2009 | Ben-Yoseph |
| 7,603,683 B2 | 10/2009 | Reto |
| 7,613,776 B1 | 11/2009 | Ben-Yoseph |
| 7,640,306 B2 | 12/2009 | Appelman et al. |
| 7,653,693 B2 | 1/2010 | Heikes |
| 7,675,903 B2 | 3/2010 | Ozugur et al. |
| 7,680,796 B2 | 3/2010 | Yeh et al. |
| 7,685,311 B2 * | 3/2010 | Friedman ............ G06F 17/3087 370/229 |
| 7,686,693 B2 | 3/2010 | Danieli et al. |
| 7,716,287 B2 | 5/2010 | Appelman et al. |
| 7,725,541 B2 | 5/2010 | Daniell et al. |
| 7,725,542 B2 | 5/2010 | Daniell et al. |
| 7,752,273 B2 | 7/2010 | Ito et al. |
| 7,774,410 B2 | 8/2010 | Gang |
| 7,774,711 B2 | 8/2010 | Valeski |
| 7,792,297 B1 | 9/2010 | Piccionelli et al. |
| 7,899,862 B2 | 3/2011 | Appelman et al. |
| 7,908,327 B2 | 3/2011 | Kucharewski |
| 7,921,368 B2 | 4/2011 | Moody et al. |
| 8,001,199 B2 | 8/2011 | Appelman |
| 8,005,919 B2 | 8/2011 | Mehanna |
| 8,046,476 B2 * | 10/2011 | Trossen ............ H04L 29/06027 709/204 |
| 8,055,675 B2 | 11/2011 | Higgins et al. |
| 8,117,265 B2 | 2/2012 | Ben-Yoseph |
| 8,122,137 B2 * | 2/2012 | Appelman et al. ............ 709/229 |
| 8,150,922 B2 | 4/2012 | Griffin et al. |
| 8,156,193 B1 | 4/2012 | Odell |
| 8,167,712 B2 | 5/2012 | Sarkar et al. |
| 8,224,916 B2 | 7/2012 | Kucharewski |
| 8,452,849 B2 | 5/2013 | Mehanna |
| 8,577,972 B1 | 11/2013 | Heikes |
| 9,203,647 B2 * | 12/2015 | Appelman ............ H04L 12/581 |
| 9,313,046 B2 * | 4/2016 | Appelman ............ H04L 12/581 |
| 2001/0002469 A1 | 5/2001 | Bates et al. |
| 2001/0003202 A1 | 6/2001 | Mache et al. |
| 2001/0003203 A1 | 6/2001 | Mache |
| 2001/0005861 A1 | 6/2001 | Mousseau et al. |
| 2001/0013050 A1 | 8/2001 | Shah |
| 2001/0013069 A1 | 8/2001 | Shah |
| 2001/0016823 A1 | 8/2001 | Richards et al. |
| 2001/0018858 A1 | 9/2001 | Dwek |
| 2001/0025280 A1 | 9/2001 | Mandato et al. |
| 2001/0034224 A1 | 10/2001 | McDowell et al. |
| 2001/0037211 A1 | 11/2001 | McNutt et al. |
| 2001/0048735 A1 | 12/2001 | O'Neal |
| 2001/0056363 A1 | 12/2001 | Gantz et al. |
| 2002/0002586 A1 | 1/2002 | Rafal et al. |
| 2002/0006803 A1 | 1/2002 | Mendiola et al. |
| 2002/0007398 A1 | 1/2002 | Mendiola et al. |
| 2002/0016818 A1 | 2/2002 | Kirani et al. |
| 2002/0021307 A1 | 2/2002 | Glenn et al. |
| 2002/0023132 A1 | 2/2002 | Tornabene et al. |
| 2002/0023147 A1 | 2/2002 | Kovacs et al. |
| 2002/0029224 A1 | 3/2002 | Carlsson |
| 2002/0032729 A1 | 3/2002 | Erickson et al. |
| 2002/0032742 A1 | 3/2002 | Anderson |
| 2002/0035605 A1 | 3/2002 | McDowell et al. |
| 2002/0042830 A1 | 4/2002 | Bose et al. |
| 2002/0046243 A1 | 4/2002 | Morris |
| 2002/0049610 A1 | 4/2002 | Gropper |
| 2002/0049704 A1 | 4/2002 | Vanderveldt et al. |
| 2002/0049751 A1 | 4/2002 | Chen et al. |
| 2002/0049806 A1 | 4/2002 | Gatz et al. |
| 2002/0049847 A1 | 4/2002 | McArdle et al. |
| 2002/0049852 A1 | 4/2002 | Lee et al. |
| 2002/0052921 A1 | 5/2002 | Morkel |
| 2002/0054092 A1 | 5/2002 | Hedloy |
| 2002/0059379 A1 | 5/2002 | Harvey et al. |
| 2002/0059401 A1 | 5/2002 | Austin |
| 2002/0059425 A1 | 5/2002 | Belfiore et al. |
| 2002/0059526 A1 | 5/2002 | Dillon et al. |
| 2002/0065828 A1 | 5/2002 | Goodspeed |
| 2002/0065856 A1 | 5/2002 | Kisiel |
| 2002/0065894 A1 | 5/2002 | Dalal et al. |
| 2002/0066036 A1 | 5/2002 | Makineni et al. |
| 2002/0071539 A1 | 6/2002 | Diament et al. |
| 2002/0078077 A1 | 6/2002 | Baumann et al. |
| 2002/0083127 A1 | 6/2002 | Agrawal |
| 2002/0083136 A1 | 6/2002 | Whitten, II |
| 2002/0084888 A1 | 7/2002 | Jin |
| 2002/0087630 A1 | 7/2002 | Wu |
| 2002/0087649 A1 | 7/2002 | Horvitz |
| 2002/0087704 A1 | 7/2002 | Chesnais et al. |
| 2002/0091667 A1 | 7/2002 | Jaipuria et al. |
| 2002/0091936 A1 | 7/2002 | Tema |
| 2002/0095464 A1 | 7/2002 | Meek |
| 2002/0095663 A1 | 7/2002 | Joory |
| 2002/0097856 A1 | 7/2002 | Wullert |
| 2002/0103801 A1 | 8/2002 | Lyons |
| 2002/0112181 A1 | 8/2002 | Smith |
| 2002/0112239 A1 | 8/2002 | Goldman |
| 2002/0116461 A1 | 8/2002 | Diacakis et al. |
| 2002/0116463 A1 | 8/2002 | Hart |
| 2002/0116528 A1 | 8/2002 | Vale |
| 2002/0116641 A1 | 8/2002 | Mastrianni |
| 2002/0118809 A1 | 8/2002 | Eisenberg |
| 2002/0119789 A1 | 8/2002 | Friedman |
| 2002/0120687 A1 | 8/2002 | Diacakis et al. |
| 2002/0120697 A1 | 8/2002 | Generous et al. |
| 2002/0120779 A1 | 8/2002 | Teeple et al. |
| 2002/0123328 A1 | 9/2002 | Snip et al. |
| 2002/0123988 A1 | 9/2002 | Dean et al. |
| 2002/0128047 A1 | 9/2002 | Gates |
| 2002/0130904 A1 | 9/2002 | Becker et al. |
| 2002/0133369 A1 | 9/2002 | Johnson |
| 2002/0136390 A1 | 9/2002 | Lang et al. |
| 2002/0137530 A1 | 9/2002 | Karve |
| 2002/0138632 A1 | 9/2002 | Bade et al. |
| 2002/0138650 A1 | 9/2002 | Yamamoto et al. |
| 2002/0143565 A1 | 10/2002 | Headings et al. |
| 2002/0144283 A1 | 10/2002 | Headings et al. |
| 2002/0151294 A1 | 10/2002 | Kirby et al. |
| 2002/0154178 A1 | 10/2002 | Barnett |
| 2002/0155826 A1 | 10/2002 | Robinson et al. |
| 2002/0160757 A1 | 10/2002 | Shavit et al. |
| 2002/0160805 A1 | 10/2002 | Laitinen et al. |
| 2002/0165000 A1 | 11/2002 | Fok |
| 2002/0165729 A1 | 11/2002 | Kuebert et al. |
| 2002/0169748 A1 | 11/2002 | Macholda |
| 2002/0174050 A1 | 11/2002 | Eynard |
| 2002/0174260 A1 | 11/2002 | Huang |
| 2002/0175953 A1 | 11/2002 | Lin |
| 2002/0178072 A1 | 11/2002 | Gusler et al. |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0184128 A1 | 12/2002 | Holtsinger |
| 2002/0184309 A1 | 12/2002 | Danker et al. |
| 2002/0184620 A1 | 12/2002 | Davies et al. |
| 2002/0187794 A1 | 12/2002 | Fostick et al. |
| 2002/0188620 A1 | 12/2002 | Doss et al. |
| 2002/0194378 A1 | 12/2002 | Foti |
| 2002/0199095 A1 | 12/2002 | Bandini et al. |
| 2003/0004855 A1 | 1/2003 | Dutta |
| 2003/0004872 A1 | 1/2003 | Gardi et al. |
| 2003/0006912 A1 | 1/2003 | Brescia |
| 2003/0009385 A1 | 1/2003 | Tucciarone et al. |
| 2003/0009698 A1 | 1/2003 | Lindeman et al. |
| 2003/0014485 A1 | 1/2003 | Banatwala |
| 2003/0018704 A1 | 1/2003 | Polychronidis et al. |
| 2003/0018726 A1 | 1/2003 | Low et al. |
| 2003/0018747 A1 | 1/2003 | Herland et al. |

(56) References Cited

U.S. PATENT DOCUMENTS

| | | |
|---|---|---|
| 2003/0023681 A1 | 1/2003 | Brown et al. |
| 2003/0023684 A1 | 1/2003 | Brown et al. |
| 2003/0023692 A1 | 1/2003 | Moroo |
| 2003/0023875 A1 | 1/2003 | Hursey |
| 2003/0025824 A1 | 2/2003 | Ishikawa |
| 2003/0028524 A1 | 2/2003 | Keskar |
| 2003/0028595 A1 | 2/2003 | Vogt et al. |
| 2003/0028597 A1 | 2/2003 | Salmi |
| 2003/0028884 A1 | 2/2003 | Swart et al. |
| 2003/0030561 A1 | 2/2003 | Yafuso et al. |
| 2003/0037110 A1 | 2/2003 | Yamamoto |
| 2003/0037112 A1 | 2/2003 | Fitzpatrick et al. |
| 2003/0037114 A1 | 2/2003 | Nishio et al. |
| 2003/0042306 A1 | 3/2003 | Irwin |
| 2003/0045272 A1 | 3/2003 | Burr |
| 2003/0046097 A1 | 3/2003 | LaSalle et al. |
| 2003/0050916 A1 | 3/2003 | Ortega |
| 2003/0050976 A1 | 3/2003 | Block |
| 2003/0051131 A1 | 3/2003 | Reinold et al. |
| 2003/0051161 A1 | 3/2003 | Smith et al. |
| 2003/0052915 A1 | 3/2003 | Brown et al. |
| 2003/0054830 A1 | 3/2003 | Williams et al. |
| 2003/0055831 A1 | 3/2003 | Ryan |
| 2003/0055897 A1 | 3/2003 | Brown et al. |
| 2003/0058478 A1 | 3/2003 | Aoki |
| 2003/0060211 A1 | 3/2003 | Chern |
| 2003/0060212 A1 | 3/2003 | Thomas |
| 2003/0064422 A1 | 4/2003 | McDevitt |
| 2003/0065721 A1 | 4/2003 | Roskind |
| 2003/0078981 A1 | 4/2003 | Harms et al. |
| 2003/0078987 A1 | 4/2003 | Serebrennikov |
| 2003/0079024 A1 | 4/2003 | Hough et al. |
| 2003/0081001 A1 | 5/2003 | Munro |
| 2003/0083046 A1 | 5/2003 | Mathis |
| 2003/0087632 A1 | 5/2003 | Sagi et al. |
| 2003/0088554 A1 | 5/2003 | Ryan |
| 2003/0101226 A1 | 5/2003 | Quine |
| 2003/0101343 A1 | 5/2003 | Eaton et al. |
| 2003/0105682 A1 | 6/2003 | Dicker et al. |
| 2003/0105820 A1 | 6/2003 | Haims et al. |
| 2003/0105822 A1 | 6/2003 | Gusler et al. |
| 2003/0106054 A1 | 6/2003 | Billmaier et al. |
| 2003/0110056 A1 | 6/2003 | Berghofer |
| 2003/0110212 A1 | 6/2003 | Lewis |
| 2003/0110293 A1* | 6/2003 | Friedman ............ G06F 17/3087 709/245 |
| 2003/0112945 A1 | 6/2003 | Brown et al. |
| 2003/0115585 A1 | 6/2003 | Barsness et al. |
| 2003/0119532 A1 | 6/2003 | Hatch |
| 2003/0119561 A1 | 6/2003 | Hatch et al. |
| 2003/0120732 A1 | 6/2003 | Couts et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0131061 A1 | 7/2003 | Newton |
| 2003/0131143 A1 | 7/2003 | Myers |
| 2003/0135659 A1 | 7/2003 | Bellotti et al. |
| 2003/0154254 A1 | 8/2003 | Awasthi |
| 2003/0154257 A1 | 8/2003 | Hantsch et al. |
| 2003/0154373 A1 | 8/2003 | Shimada et al. |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158860 A1 | 8/2003 | Caughey |
| 2003/0158864 A1 | 8/2003 | Samn |
| 2003/0158902 A1 | 8/2003 | Volach |
| 2003/0161335 A1 | 8/2003 | Fransdonk |
| 2003/0167308 A1 | 9/2003 | Schran |
| 2003/0167310 A1 | 9/2003 | Moody et al. |
| 2003/0167324 A1 | 9/2003 | Farnham et al. |
| 2003/0172349 A1 | 9/2003 | Katayama |
| 2003/0174164 A1 | 9/2003 | Capps |
| 2003/0177175 A1 | 9/2003 | Worley et al. |
| 2003/0177190 A1 | 9/2003 | Moody et al. |
| 2003/0179930 A1 | 9/2003 | O'Dell et al. |
| 2003/0185232 A1 | 10/2003 | Moore et al. |
| 2003/0185360 A1 | 10/2003 | Moore et al. |
| 2003/0187813 A1 | 10/2003 | Goldman |
| 2003/0188199 A1 | 10/2003 | Tadano et al. |
| 2003/0188263 A1 | 10/2003 | Bates et al. |
| 2003/0191673 A1 | 10/2003 | Cohen |
| 2003/0191753 A1 | 10/2003 | Hoch |
| 2003/0191969 A1 | 10/2003 | Katsikas |
| 2003/0196967 A1 | 10/2003 | Robinson et al. |
| 2003/0197729 A1 | 10/2003 | Denoue et al. |
| 2003/0200272 A1 | 10/2003 | Campise et al. |
| 2003/0204568 A1 | 10/2003 | Bhargava et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0208547 A1 | 11/2003 | Branimir |
| 2003/0210265 A1 | 11/2003 | Haimberg |
| 2003/0212745 A1 | 11/2003 | Caughey |
| 2003/0217109 A1 | 11/2003 | Ordille et al. |
| 2003/0220835 A1 | 11/2003 | Barnes, Jr. |
| 2003/0220946 A1 | 11/2003 | Malik |
| 2003/0220976 A1 | 11/2003 | Malik |
| 2003/0222902 A1* | 12/2003 | Chupin et al. ................ 345/738 |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0227894 A1 | 12/2003 | Wang et al. |
| 2003/0228908 A1 | 12/2003 | Caiafa et al. |
| 2003/0229668 A1 | 12/2003 | Malik |
| 2003/0229717 A1 | 12/2003 | Teague |
| 2003/0229722 A1 | 12/2003 | Beyda |
| 2003/0233265 A1 | 12/2003 | Lee et al. |
| 2003/0233413 A1 | 12/2003 | Becker |
| 2003/0233416 A1 | 12/2003 | Beyda |
| 2003/0233417 A1 | 12/2003 | Beyda et al. |
| 2003/0233418 A1 | 12/2003 | Goldman |
| 2003/0233650 A1 | 12/2003 | Zaner et al. |
| 2003/0236120 A1 | 12/2003 | Reece et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0003071 A1 | 1/2004 | Mathew et al. |
| 2004/0005881 A1 | 1/2004 | Ala-Luukko |
| 2004/0006621 A1 | 1/2004 | Bellinson et al. |
| 2004/0010808 A1 | 1/2004 | deCarmo |
| 2004/0017396 A1 | 1/2004 | Werndorfer et al. |
| 2004/0019637 A1 | 1/2004 | Goodman et al. |
| 2004/0019645 A1 | 1/2004 | Goodman et al. |
| 2004/0019650 A1 | 1/2004 | Auvenshine |
| 2004/0019671 A1 | 1/2004 | Metz |
| 2004/0019695 A1 | 1/2004 | Fellenstein et al. |
| 2004/0024478 A1 | 2/2004 | Hans et al. |
| 2004/0024822 A1 | 2/2004 | Werndorfer et al. |
| 2004/0024892 A1 | 2/2004 | Creswell et al. |
| 2004/0029567 A1 | 2/2004 | Timmins et al. |
| 2004/0029572 A1 | 2/2004 | Nerot |
| 2004/0030741 A1 | 2/2004 | Wolton et al. |
| 2004/0030750 A1 | 2/2004 | Moore et al. |
| 2004/0030787 A1 | 2/2004 | Jandel |
| 2004/0031058 A1 | 2/2004 | Reisman |
| 2004/0044536 A1 | 3/2004 | Fitzpatrick et al. |
| 2004/0044723 A1 | 3/2004 | Bell et al. |
| 2004/0044736 A1 | 3/2004 | Austin-Lane et al. |
| 2004/0052356 A1 | 3/2004 | McKinzie et al. |
| 2004/0054646 A1 | 3/2004 | Daniell et al. |
| 2004/0054729 A1 | 3/2004 | Fukuizumi et al. |
| 2004/0054733 A1 | 3/2004 | Weeks |
| 2004/0054735 A1 | 3/2004 | Daniell et al. |
| 2004/0054736 A1 | 3/2004 | Daniell et al. |
| 2004/0056901 A1 | 3/2004 | March et al. |
| 2004/0059708 A1 | 3/2004 | Dean et al. |
| 2004/0059781 A1 | 3/2004 | Yoakum et al. |
| 2004/0059942 A1 | 3/2004 | Xie |
| 2004/0064586 A1 | 4/2004 | Weigand |
| 2004/0073643 A1 | 4/2004 | Hayes et al. |
| 2004/0078440 A1 | 4/2004 | Potter et al. |

(56) References Cited

U.S. PATENT DOCUMENTS

| | | |
|---|---|---|
| 2004/0078445 A1 | 4/2004 | Malik |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0098491 A1 | 5/2004 | Costa-Requena et al. |
| 2004/0103156 A1 | 5/2004 | Quillen et al. |
| 2004/0107119 A1 | 6/2004 | Ohishi |
| 2004/0111261 A1 | 6/2004 | Chaudhari et al. |
| 2004/0117443 A1 | 6/2004 | Barsness |
| 2004/0117451 A1 | 6/2004 | Chung |
| 2004/0117831 A1 | 6/2004 | Ellis et al. |
| 2004/0122681 A1 | 6/2004 | Ruvolo |
| 2004/0122730 A1 | 6/2004 | Tucciarone et al. |
| 2004/0122810 A1 | 6/2004 | Mayer |
| 2004/0122855 A1 | 6/2004 | Ruvolo |
| 2004/0122901 A1 | 6/2004 | Sylvain |
| 2004/0133564 A1 | 7/2004 | Gross et al. |
| 2004/0137882 A1 | 7/2004 | Forsyth |
| 2004/0141599 A1 | 7/2004 | Tang et al. |
| 2004/0143564 A1 | 7/2004 | Gross et al. |
| 2004/0148347 A1 | 7/2004 | Appelman et al. |
| 2004/0152477 A1 | 8/2004 | Wu et al. |
| 2004/0152517 A1 | 8/2004 | Hardisty et al. |
| 2004/0153506 A1 | 8/2004 | Ito et al. |
| 2004/0153518 A1 | 8/2004 | Seligmann et al. |
| 2004/0153552 A1* | 8/2004 | Trossen ............ H04L 29/06027 709/229 |
| 2004/0154022 A1 | 8/2004 | Boss et al. |
| 2004/0157586 A1 | 8/2004 | Robinson et al. |
| 2004/0158631 A1 | 8/2004 | Chang et al. |
| 2004/0162830 A1 | 8/2004 | Shirwadkar et al. |
| 2004/0171396 A1 | 9/2004 | Carey et al. |
| 2004/0172396 A1* | 9/2004 | Vanska et al. .................... 707/9 |
| 2004/0172481 A1 | 9/2004 | Engstrom |
| 2004/0176076 A1 | 9/2004 | Uppuluri |
| 2004/0176081 A1 | 9/2004 | Bryham et al. |
| 2004/0177119 A1 | 9/2004 | Mason et al. |
| 2004/0179039 A1 | 9/2004 | Blattner et al. |
| 2004/0183829 A1 | 9/2004 | Kontny et al. |
| 2004/0186738 A1 | 9/2004 | Reisman |
| 2004/0186887 A1 | 9/2004 | Galli et al. |
| 2004/0186989 A1* | 9/2004 | Clapper ........................ 713/151 |
| 2004/0193684 A1 | 9/2004 | Ben-Yoseph |
| 2004/0193722 A1 | 9/2004 | Donovan |
| 2004/0196315 A1 | 10/2004 | Swearingen et al. |
| 2004/0198351 A1 | 10/2004 | Knotts |
| 2004/0199581 A1 | 10/2004 | Kucharewski et al. |
| 2004/0199582 A1 | 10/2004 | Kucharewski et al. |
| 2004/0201624 A1 | 10/2004 | Crawford |
| 2004/0203766 A1 | 10/2004 | Jenniges et al. |
| 2004/0204068 A1 | 10/2004 | Komaki |
| 2004/0204140 A1 | 10/2004 | Nagata |
| 2004/0205126 A1 | 10/2004 | Ben-Yoseph |
| 2004/0205127 A1 | 10/2004 | Ben-Yoseph |
| 2004/0210639 A1 | 10/2004 | Ben-Yoseph et al. |
| 2004/0210844 A1 | 10/2004 | Pettinati |
| 2004/0215648 A1 | 10/2004 | Marshall |
| 2004/0215721 A1 | 10/2004 | Szeto et al. |
| 2004/0215793 A1 | 10/2004 | Ryan et al. |
| 2004/0219936 A1 | 11/2004 | Kontiainen |
| 2004/0220897 A1 | 11/2004 | Bernhart et al. |
| 2004/0221309 A1 | 11/2004 | Zaner |
| 2004/0231003 A1 | 11/2004 | Cooper et al. |
| 2004/0243844 A1 | 12/2004 | Adkins |
| 2004/0255122 A1 | 12/2004 | Ingerman et al. |
| 2004/0267604 A1 | 12/2004 | Gross et al. |
| 2005/0004978 A1 | 1/2005 | Reed et al. |
| 2005/0004984 A1 | 1/2005 | Simpson |
| 2005/0004995 A1 | 1/2005 | Stochosky |
| 2005/0009541 A1 | 1/2005 | Ye et al. |
| 2005/0015432 A1 | 1/2005 | Cohen |
| 2005/0021750 A1 | 1/2005 | Abrams |
| 2005/0021854 A1 | 1/2005 | Bjorkner |
| 2005/0027382 A1 | 2/2005 | Kirmse et al. |
| 2005/0038856 A1 | 2/2005 | Krishnasamy |
| 2005/0050143 A1 | 3/2005 | Gusler et al. |
| 2005/0055306 A1 | 3/2005 | Miller et al. |
| 2005/0055340 A1 | 3/2005 | Dresden |
| 2005/0055416 A1 | 3/2005 | Heikes |
| 2005/0066362 A1 | 3/2005 | Rambo |
| 2005/0071251 A1 | 3/2005 | Linden et al. |
| 2005/0076240 A1 | 4/2005 | Appleman |
| 2005/0076241 A1 | 4/2005 | Appleman |
| 2005/0086305 A1 | 4/2005 | Koch et al. |
| 2005/0091314 A1 | 4/2005 | Blagsvedt et al. |
| 2005/0976241 | 4/2005 | Appelman |
| 2005/0096084 A1 | 5/2005 | Pohja et al. |
| 2005/0102202 A1 | 5/2005 | Linden et al. |
| 2005/0108091 A1* | 5/2005 | Sotak .................. G06Q 30/0264 705/14.61 |
| 2005/0108329 A1 | 5/2005 | Weaver et al. |
| 2005/0108341 A1 | 5/2005 | Mathew et al. |
| 2005/0114229 A1 | 5/2005 | Ackley |
| 2005/0114783 A1 | 5/2005 | Szeto |
| 2005/0125559 A1 | 6/2005 | Mutha |
| 2005/0130633 A1 | 6/2005 | Hill et al. |
| 2005/0149606 A1 | 7/2005 | Lyle et al. |
| 2005/0160144 A1 | 7/2005 | Bhatia |
| 2005/0171955 A1 | 8/2005 | Hull et al. |
| 2005/0172001 A1 | 8/2005 | Zaner et al. |
| 2005/0177486 A1 | 8/2005 | Yeager |
| 2005/0181878 A1 | 8/2005 | Danieli et al. |
| 2005/0187020 A1 | 8/2005 | Amaitis et al. |
| 2005/0188044 A1 | 8/2005 | Fleming, III |
| 2005/0195802 A1 | 9/2005 | Klein et al. |
| 2005/0197846 A1 | 9/2005 | Pezaris |
| 2005/0198131 A1 | 9/2005 | Appelman et al. |
| 2005/0198164 A1 | 9/2005 | Moore et al. |
| 2005/0198172 A1 | 9/2005 | Appelman et al. |
| 2005/0198173 A1 | 9/2005 | Evans |
| 2005/0198268 A1 | 9/2005 | Chandra |
| 2005/0204063 A1 | 9/2005 | O'Brien |
| 2005/0208957 A1 | 9/2005 | Knotts |
| 2005/0216300 A1 | 9/2005 | Appelman et al. |
| 2005/0223075 A1 | 10/2005 | Swearingen et al. |
| 2005/0239550 A1 | 10/2005 | Hardisty et al. |
| 2005/0246420 A1 | 11/2005 | Little |
| 2005/0251515 A1 | 11/2005 | Reed |
| 2005/0289469 A1 | 12/2005 | Chandler et al. |
| 2006/0009243 A1 | 1/2006 | Dahan et al. |
| 2006/0026237 A1 | 2/2006 | Wang et al. |
| 2006/0031080 A1 | 2/2006 | Mallya et al. |
| 2006/0031772 A1 | 2/2006 | Valeski |
| 2006/0036701 A1 | 2/2006 | Bulfer et al. |
| 2006/0047187 A1 | 3/2006 | Goyal et al. |
| 2006/0047747 A1 | 3/2006 | Erickson et al. |
| 2006/0116139 A1 | 6/2006 | Appelman |
| 2006/0117380 A1 | 6/2006 | Tachizawa et al. |
| 2006/0129678 A1 | 6/2006 | Morita |
| 2006/0136584 A1 | 6/2006 | Decker et al. |
| 2006/0149644 A1 | 7/2006 | Sulmar et al. |
| 2006/0154650 A1 | 7/2006 | Sherman et al. |
| 2006/0168204 A1 | 7/2006 | Appelman et al. |
| 2006/0221173 A1 | 10/2006 | Duncan |
| 2006/0242583 A1 | 10/2006 | MacNaughton et al. |
| 2006/0259344 A1 | 11/2006 | Patel et al. |
| 2006/0259476 A1 | 11/2006 | Kadayam et al. |
| 2006/0271687 A1 | 11/2006 | Alston et al. |
| 2006/0288077 A1 | 12/2006 | Chen et al. |
| 2007/0092072 A1 | 4/2007 | Jacobs |
| 2007/0112966 A1 | 5/2007 | Eftis et al. |
| 2007/0157098 A1* | 7/2007 | Chupin et al. ................ 715/764 |
| 2007/0185957 A1 | 8/2007 | Mandalia et al. |
| 2007/0250566 A1 | 10/2007 | Appelman |
| 2008/0008106 A1 | 1/2008 | Boberg et al. |
| 2008/0133417 A1 | 6/2008 | Robinson |
| 2008/0255989 A1 | 10/2008 | Altberg et al. |
| 2008/0288604 A1 | 11/2008 | Major et al. |
| 2009/0016499 A1 | 1/2009 | Hullfish |
| 2009/0043844 A1 | 2/2009 | Zimmet et al. |
| 2009/0070306 A1 | 3/2009 | Stroe |
| 2009/0070433 A1 | 3/2009 | Karstens |
| 2009/0299934 A1 | 12/2009 | Horvitz et al. |
| 2011/0047487 A1 | 2/2011 | DeWeese et al. |

(56) References Cited

U.S. PATENT DOCUMENTS

| | | |
|---|---|---|
| 2011/0167116 A1 | 7/2011 | Kucharewski |
| 2011/0179117 A1 | 7/2011 | Appelman |
| 2011/0282955 A1 | 11/2011 | Appelman |
| 2012/0011110 A1 | 1/2012 | Mehanna |
| 2012/0198012 A1 | 8/2012 | Odell |
| 2012/0233269 A1 | 9/2012 | Ben-Yoseph |
| 2013/0013686 A1 | 1/2013 | Kucharewski |
| 2013/0066990 A1 | 3/2013 | Ben-Yoseph |
| 2013/0066991 A1 | 3/2013 | Ben-Yoseph |
| 2013/0066992 A1 | 3/2013 | Ben-Yoseph |
| 2013/0067002 A1 | 3/2013 | Heikes |
| 2013/0067003 A1 | 3/2013 | Heikes |
| 2013/0072239 A1 | 3/2013 | Hullfish |
| 2013/0073580 A1 | 3/2013 | Mehanna |
| 2013/0073627 A1 | 3/2013 | Mehanna |
| 2013/0073653 A1 | 3/2013 | Heikes |
| 2013/0073656 A1 | 3/2013 | Hullfish |
| 2013/0073657 A1 | 3/2013 | Hullfish |
| 2013/0073966 A1 | 3/2013 | Appelman |
| 2013/0073967 A1 | 3/2013 | Appelman |
| 2013/0073968 A1 | 3/2013 | Appelman |
| 2013/0080528 A1 | 3/2013 | Mehanna |
| 2013/0097254 A1 | 4/2013 | Appelman |
| 2013/0097255 A1 | 4/2013 | Appelman |
| 2013/0097256 A1 | 4/2013 | Appleman |
| 2013/0117399 A1 | 5/2013 | Appelman |
| 2013/0124506 A1 | 5/2013 | Mehanna |
| 2013/0124629 A1 | 5/2013 | Appelman |
| 2013/0125138 A1 | 5/2013 | Appelman |
| 2013/0132376 A1 | 5/2013 | Mehanna |
| 2013/0138634 A1 | 5/2013 | Mehanna |
| 2013/0138680 A1 | 5/2013 | Mehanna |
| 2013/0144876 A1 | 6/2013 | Mehanna |
| 2013/0144898 A1 | 6/2013 | Mehanna |
| 2013/0145040 A1 | 6/2013 | Mehanna |
| 2013/0151546 A1 | 6/2013 | Mehanna |
| 2013/0159290 A1 | 6/2013 | Mehanna |
| 2013/0159420 A1 | 6/2013 | Appelman |
| 2013/0159439 A1 | 6/2013 | Appelman |
| 2013/0159440 A1 | 6/2013 | Appelman |
| 2013/0159441 A1 | 6/2013 | Appelman |
| 2013/0159442 A1 | 6/2013 | Appelman |
| 2013/0173722 A1 | 7/2013 | Kucharewski |
| 2013/0174060 A1 | 7/2013 | Odell |
| 2013/0332957 A1 | 12/2013 | Deweese et al. |

FOREIGN PATENT DOCUMENTS

| | | |
|---|---|---|
| CN | 1348296 | 5/2002 |
| CN | 100476805 | 4/2009 |
| DE | 10048653 | 4/2002 |
| EP | 0889660 | 1/1999 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| EP | 1565845 | 8/2008 |
| GB | 2328835 | 3/1999 |
| GB | 2357932 | 7/2001 |
| GB | 2368747 | 5/2002 |
| JP | 04-86950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 97/34244 | 9/1997 |
| WO | WO 97/37303 | 10/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/47270 | 8/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2006/026908 | 3/2003 |
| WO | WO 2004/046875 | 6/2004 |
| WO | WO 2004/046949 | 6/2004 |
| WO | WO 2004/046970 | 6/2004 |
| WO | WO 2004/088943 | 10/2004 |
| WO | WO 2004/111812 | 12/2004 |
| WO | WO 2004/111871 | 12/2004 |
| WO | WO 2005/010709 | 2/2005 |
| WO | WO 2005/054991 | 6/2005 |
| WO | WO 2005/057329 | 6/2005 |
| WO | WO 2005/086723 | 9/2005 |
| WO | WO 2005/089286 | 9/2005 |
| WO | WO 2006/066092 | 6/2006 |
| WO | WO 2006/068955 | 6/2006 |

OTHER PUBLICATIONS

International Application No. PCT/US2004/029291, filed Sep. 8, 2004, 47 pages.
International Search Report mailed Dec. 27, 2005 for International Application No. PCT/US04/29291, filed Sep. 8, 2004, 5 pages.
International Search Report for International Application No. PCT/US05/45630, dated Oct. 23, 2006, 5 pages.
Office Action mailed Jan. 8, 2008 for U.S. Appl. No. 10/415,211, filed Nov. 18, 2003, 20 pages.
Written Opinion mailed Dec. 27, 2005 for International Application No. PCT/US04/29291, filed Sep. 8, 2004.
Written Opinion for International Application No. PCT/US05/45630, dated Oct. 23, 2006, 6 pages.
Haim Schneider, Lotus Developer Domain, "Adding a popup menu to your Sametime links," Jul. 1, 2003, 8 pages.
IBM Lotus Software, Sametime Everyplace FAQ Overview Information, (visited Jul. 28, 2003), 3 pages.
IBM Lotus Software, Sametime Everyplace Wireless Collaboration that's Fit for e-Business, (Jul. 2, 2003), 2 pages.
Kirk Scott, "Ubique's Virtual Places: Communication and interaction on the World Wide Web," (visited Jul. 28, 2003), 2 pages.

(56) References Cited

OTHER PUBLICATIONS

Tara Hall, Lotus Developer Domain, Place, Sametime with Chris Price, (visited Jul. 28, 2003), 8 pages.
Notification of Transmittal of the International Search Report and the Written Opinion of the International Searching Authority for International Application No. PCT/US2004/029291; Dec. 27, 2005; 9 pages.
U.S. Appl. No. 11/023,652, Apr. 29, 2014, Office Action.
U.S. Appl. No. 13/189,972, Apr. 21, 2014, Office Action.
U.S. Appl. No. 13/442,226, Apr. 14, 2014, Office Action.
U.S. Appl. No. 13/614,640, Jun. 11, 2014, Notice of Allowance.
U.S. Appl. No. 13/614,781, Apr. 2, 2014, Office Action.
U.S. Appl. No. 13/617,270, Apr. 10, 2014, Office Action.
U.S. Appl. No. 13/617,330, Apr. 8, 2014, Office Action.
U.S. Appl. No. 13/619,009, Apr. 11, 2014, Notice of Allowance.
U.S. Appl. No. 13/619,054, Apr. 7, 2014, Office Action.
U.S. Appl. No. 13/620,851, Apr. 8, 2014, Office Action.
U.S. Appl. No. 13/755,990, May 16, 2014, Notice of Allowance.
U.S. Appl. No. 13/766,781, May 6, 2014, Office Action.
U.S. Appl. No. 13/766,785, May 14, 2014, Office Action.
U.S. Appl. No. 13/766,776, May 8, 2014, Office Action.
U.S. Appl. No. 13/766,779, Apr. 11, 2014, Office Action.
U.S. Appl. No. 13/620,862, Aug. 3, 2015, Notice of Allowance.
U.S. Appl. No. 13/620,863, Jun. 19, 2015, Office Action.
U.S. Appl. No. 13/620,865, Jun. 16, 2016, Office Action.
U.S. Appl. No. 10/715,213, filed Nov. 18, 2003, Schlegel.
U.S. Appl. No. 10/974,969, filed Oct. 28, 2004, Wick.
U.S. Appl. No. 11/023,652, filed Dec. 29, 2004, Odell.
U.S. Appl. No. 13/361,141, filed Jan. 30, 2012, Appelman et al.
Automated feature of Internet Explorer, www.geocities.com/technofundo/tech/web/ie_autocomplete.html, pp. 1-6, Feb. 18, 2004.
"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.
Adeptra Services Overview; Nov. 7, 2002; adeptra.com ; pp. 1-7.
Adeptra, Features; Nov. 27, 2002; adeptra.com ; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http:// www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.

Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Boyce, Jim, "Microsoft Office Outlook 2003 Inside Out," Microsoft Press (published Nov. 12, 2003), pp. 252.
Brugali, David, "Mediating the Internet," Annals of Software Engineering, vol. 13, pp. 285-308, Jun. 2002, Kluwer Academic Publishers, The Netherlands.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.
Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs—Rsearch, Aug. 2001.
Chung-Hwa-Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts—Google Scholar" available at http://scholar.google.com/scholar?hl=en&lr=&q=creating+a+single+list+list+of+contacts&as . . . (Mar. 27, 2007), 10 pages.
CommWorks 8250 Personal Communications Management System; Dec. 11, 2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. and Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13, 2001, Internet: download. cnet.com/downloads/O-10059-100-6932612 shtml, (3 pages).
Convergys Interactive Alerts Reduce Customer Care Costs and Improve Customer Satisfaction; convergys.com ; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of -20Separation-20Email-20Spam-20Protecti . . . printed on Mar. 1, 2004 (3 pages).
"Denied Database for KnockKnock," http://www.knockmail coml support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.

(56) References Cited

OTHER PUBLICATIONS

Global Solutions Directory; Nov. 7, 2002; softwaresibm.com; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Hubbub: a sound enhanced mobile instant messenger that supports awareness and opportunistic interactions, Issacs, E. and Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know WhetherYou Sizzle or Fizzle, Marino, Jul. 11, 2001, Florida Times Union, p. C.1. (2 total pages).
Home-tribe.net, http://washingtondc stribe meUmessage/24434d1b-817b-4580 -aa42 -3bffa15 f26a?page=1 , (4 pages), printed from Internet Dec. 13, 2004, message dated Oct. 19, 2003.
http://www.friendstercom , (17 pages), Dec. 2004.
http://www.knockrnail.com/support/newsettings.jpg, as accessed on Dec. 4. 2003.
"Icq.anywhere, Email Features-Email Center-Icq.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com; pp. 1-2.
Ignite Software: Parent Tools Feature Set, "Parent Tools Features," http://www.parent.tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic . . . , (visted Jul. 28, 2003).
IBM Lotus Software, Sametime Everyplace Wireless Collaboration that's Fit for e-Business, pp. 1-6, http://www.lotus.com/products.wireless.nsf/allpublic . . . , (visited Jul. 28, 2003).
IM Means Business IEEE Spectrum, Nov. 2002.
imForwards.com—FAQ's; Oct. 21, 2003.
Index of /tarvizo/oldfiles/elips/tnt-2.4, Jul. 2nd, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOIpatt.html?acbmn1+0 &adxnnlx=107029 . . . , printed on Nov. 5, 2004 (2 pages).
"Instant Messaging for Gamers," PC Gamer, May 2004, vol. 11, No. 5, (2 pages).

J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au , Dec. 02, 2003.
Jabber, Inc., Jabber Wireless Gateway Overview, May 2001.
"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=al.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.
Komatsu et al., "Text Input with Dynamic Abbreviation Expansion," IPSJ SIG Notes, vol. 2001, No. 87, Sep. 14, 2008, pp. 133-138, in Japanese with a partial English Translation.
Kirk Scott, Ubique's Virtual Places: Communication and interaction on the World Wide Web, 1 page, http://www.w3.org/collabroation/workshop/proceedings/p2.html, (visted Jul. 28, 2003).
Kyungkoo Jun, et al., "Agent-Based Resource Discovery", IEEE (Feb. 2000), 10 page.
Laliberte et al., "A Protocol for Scalable Group and Public Annotations," Elsevier, Apr. 1995, pp. 911-918.
Leander Kahney, "Will You Buy a Car From This Man?", Oct. 6, 2003, pp. 1-3, available at http://www.wired.com/techbizlmedia/news/2003/10/60703.
"Learning Spam: Simple Techniques for Freely-Available Software," Bart Massey et ai, Computer Science Dept., Portland, or USA, Apr. 2003, pp. 1-14.
"Lotus Instant Messaging Everyplace FAQ" retrieved Apr. 29, 2004 from the World Wide Web: http://www.lotus.com/products/product4nsf/wdocs/249c6f083166cd3e85256d7300714407, (3 pages).
Lieberman, H., "Letizia: An Agent that Assists Web Browsing", Aug. 20, 1995, pp. 924-929.
"Listsery Control for KnockKnock," http://www.knockmail com/supporUlistservcont.html, pp. 1, as accessed on Dec. 4, 2003.
Luis Felipe Cabrera et al., "Herald: Achieving a Global Event NotificationService", Microsoft Research, May 2001.
M. Castelluccio, "E-mail in Real Time", Strategic Finance, Sep. 1999, INSPEC p. 10.
M. Day, S Aggarwal, G Mohr, J. Vincent, RFC 2279 Instant Messaging/Presence Protocol Requirements, Feb. 2000.
M. Meola et al., "Real-Time Reference Service for the Remote User: From the Telephone and Electronic Mail to Internet Chat, Instant Messaging and Collaborative Software", Reference Librarian, Dec. 1999, INSPEC p. 8.
M. Smith et al.; Conversation Trees and Threaded Chats; Collaboration & Multimedia Group, Microsoft Research, Redmond, WA, Feb. 2000.
"Managing your Addresses in Knockmail," http://www.knockmail.com/supporUmanaddresses.html, pp. 1-2, as accessed on Dec. 4, 2003.
McMurray, Susan, "Shield your children from unsuitable Internet content," http://www.microsoft.com/canada/home/internet&security/2.4.8protectwithparentalcontrolshowtosafeguardyourcomputer.asp#, Microsoft Home Magazine, pp. 1-3, as accessed on Dec. 10, 2003.
Mark Handel et al., "TeamPortal: Providing Team Awareness on the Web", Dec. 2000.
McKendrick, Joseph; "Internet Call Centers: New Era in Customer Service", Feb. 2002; VIO, n2, (4 pages).
Microservices: CommWorks Find Me-Follow Me Application; Dec. 11, 2002; commworks.com; pp. 1-2.

(56) References Cited

OTHER PUBLICATIONS

Microservices: CommWorks Message Alert System; Dec. 11, 2002; commworks.com; pp. 1-3.
Microservices: CommWorks Message Delivery System; Dec. 11, 2002; commworks.com; pp. 1-2.
Microsoft PressPass; Nov. 7, 2002; microsoft.com ; pp. 1-9.
Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.
Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.
Mozilla, www.mozilla.org/projects/ml/autocomplete, Mar. 13, 2003.
Moore, J. "AOL's Grand Goal; America Online seeks to transform itself into a major Internet player,"Information Week, Jul. 31, 1995, lines 7-23, pp. 38-42.
N. Liew Kwek Sing; AOL ICQ vs. MSN Messenger; Department of Electronic and Computer Science, University of Southampton, Mar. 2003.
Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennslyvannia, USA.) CSCW '00. ACM New York, NY, 79-88.
Nextel Announces On-Line Paging Service Provided by Wireless Services—First Wireless Telephone Messaging Service to Offer Delivery Confirmation, Aug. 12, 1998, NY.
Net Alerts Overview; Nov. 7, 2002; microsoft.com ; pp. 1-3.
Neo Mai, Ken Neo. "Buying and selling on the internet; [Computimes, 2* Edition]." New Straits Times. Kuala Lumpur: Jun. 28, 2001. p. 53.
Online! Feb. 1,2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep. 17, 2004 the whole document.
Olsen, Stefanie, "Will instant messaging become instant spamming?,". http://news.com.com/2100-1023-252765.html?legacy=cnet, Feb. 16, 2001, pp. 1-4.
Ozmosys Enterprise; Nov. 7, 2002; ozmosys.com ; pp. 1-3.
"Pending Database for KnockKnock," http://www.knockmail coml support/penddatabase.html, pp. 1, as accessed on Dec. 4, 2003.
"Preview Pending Emails in KnockMail," http://www.knockmail.com/supporUpreviewemail.html, pp. 1-2, as accessed on Dec. 4, 2003.
"Protect Your Privacy," MSN Features, http://messenger.msn.com/Feature/Privacy.aspx, as accessed on Dec. 2, 2003.
Parviainen et al., "Mobile Instant Messaging", Jul. 3, 2003 IEEE.
Patrice Godefroid et al., "Ensuring Privacy in Presence Awareness Systems: An Automated Verification Approach". Feb. 2000.
Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.
Per E. Pedersen et al.; Using the Theory of Planned Behavior to Explain Teenager's Adoption of Text Messaging Services; Agder University College, Jun. 2002.
Per E. Pedersen; The Adoption of Text Messaging services among Norwegian Teens: Development and Test of an Extended Adoption Model; SNF-Report No. 23/02; Samfunns-Og Naeringslivsforskning As Bergen, Jun. 2002.
Phillips Business Information corporation—Aug. 23, 1999—Instant messaging has emerged as one of the most popular communication mediums in the world.
Prodigy Launches 100 Interest Groups on the World Wide Web; All Sites Have Deep Links to Chat and Newsgroups; Topics Range from "Adventure Travel" and "Astrology" to "Virtual Reality" and "Wrestling", Business Wire, Sep. 27, 1995, 4 Pages.

"Plaxo—Update Your Address Book," Plaxo Contact Networks, reprinted from http://web.archive.org/web/20030218233638/http://www.plaxo.com printed on Nov. 5, 2004 (available on Feb. 18,2003), (1 page).
"Plaxo", Plaxo, reprinted from http://web.archive.org/web/20041105072256/http://www.plaxo.com/ printed on Nov. 5, 2004 (available on Feb. 14, 2004) (2 pages).
Parent Tools TheUltimate in Monitoring and Controlling AIM "Parent Tools for AIM," http://www.parent-tools.com/screenshots.htm, pp. 1-4, as accessed on Dec. 10, 2003.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging," retrieved Apr. 29, 2004 from the World Wide Web: http://www.rimrod.com/software/rim//Webmessenger-RIM-J2ME-Instant-Messaging-20 . . . , pp. 1-4.
"Reflections on Friendster, Trust and Intimacy," Danah Boyd, Ubicomp 2003, Workshop Application for The Intimate Ubiquitous Computing Workshop. Seattle, WA, Oct. 12-15, 2003, (4 pages).
R. Movva & W. Lai, "MSN Messenger Service 1.0 Protocol", Aug. 1999, Internet Draft, http://toolsietf.org/id/draft-movva-msn-messenger-protocol-oo.bct, 28 pages.
Reichard, K., "AOL, ICO to Interoperate—But in a Limited Fashion," Oct. 30, 2002, InstantMessagingPlanet, available at www.instantmessagingplanet.com/public/articie.php/1490771.
Ryze home page, www.ryze.com , Dec. 21, 2003, available at http://web.archivesorg/web/20031221010006/http://ryze .com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin. Retrieved on May 21, 2013.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No. 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Aug. 4, 2003, (3 pages).
Sm Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31,2003, (1 page).
"Social Networking for Business: Release 0.5," Esther Dyson, Esther Dyson's Monthly Report, vol. 21, No. 10, Nov. 25, 2003, www.edventure.com , (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).

(56) References Cited

OTHER PUBLICATIONS

"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com ; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDm '2001 (IEEE ICDM—2001 Workshop on Text Mining); San Jose, CA, 2001, pp. 1-14, Nov. 2001.
The Wall Street Journal article "Esniff Ferrets Out Misbehavior by 'Reading' E-Mail, Web Visits," Katherine Lange, interactive.wsj.com, Apr. 27, 2001, Tech Q&A.
The Early Report—The Early Show segment, "Big Brother in the Corner Office," Julie Chen, cbsnews.com/earlyshow/caught/techage/20001228esniff.shtml, Dec. 28, 2000: Tech Age.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"The eSniff Product Overview," eSniff: Define Your e-Boundaries, www.esniff.com/product overview.html, May 15, 2001.
"Text Categorization with Support Vector Machines: Learning with Many Relevant Features," Thorsten Joachims, University of Dortmund, Computer Science Dept., Ls-8 Report 23, 1998, (18 paqes), Nov. 27, 1997, revised Apr. 19, 1998.
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat-Instant Messaging is Taking Off, and for Some Users Its Nuzzling Out the Phone," Nick Wingfield, Asian WSJ, Sep. 2000, (5 pages).
"Trillian Discussion Forums—HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of Aug. 2002, Melbourne, Sep. 4-6, 2002, (17 pages).
Tara Hall, Lotus Developer Domain, "Same Place, Sametime with Chris Price", pp. 1-8, http://www.10.lotus.com/Idd/today.nsf/DisplayForm/ . . . , (Visited Jul. 28, 2003), Sep. 2002.
Teraitech; Nov. 7, 2002; teraitech.com ; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com ; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web. archive. org/web/20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity—Home, reprinted from http://web.archive.org/web/20030228131435/www.huminity.com/default.php?internationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Yiva Hard of Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home page, www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.8-2201, dated Feb. 8, 2008, 5 pages.
English translation of an Office Action issued in corresponding Japanese Application No. 2004-570418 on Aug. 7, 2008.
English translation of an Office Action issued in corresponding Japanese Application No. 2004-570418 on Feb. 5, 2009.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).
Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages).
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English translation.
Office Action mailed Apr. 21, 2005 for European Application No. 97946924.4-1238, 6 pages.
Office Action mailed May 21, 2008 for European Application No. 97946924.4-1238, 10 pages.
International Search Report dated Jan. 27, 2005 for International Application No. PCT US2004/009422, International Filing Date Mar. 26, 2004.
International Search Report issued in International Application No. PCT/US03/36795 mailed Jun. 23, 2004, 9 pages.
International Search Report, Application Serial No. PCT/US04/23382, dated Feb. 1, 2007, 12 pages.
International Search Report of PCT/US03/36654 dated Aug. 17, 2004.
International Standard, Information technology—telecommunications and information exchange between systems—private integrated services network—specifications, functional model and information flows—Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.

(56) References Cited

OTHER PUBLICATIONS

European Office Action, Application Serial No. 03 811 631.5-2201, dated Oct. 4, 2006, 4 pages.
European Search Report, Application No. EP 03811631, dated Jun. 23, 2006, 5 pages.
Office Action from the Canadian Intellectual Property Office in corresponding Canadian Application No. 2,506,417, dated Aug. 14, 2007, 3 pages.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/633,636, Oct. 11, 2006, Office Action.
U.S. Appl. No. 10/651,303, Feb. 9, 2007, Office Action.
U.S. Appl. No. 10/651,303, Apr. 28, 2008, Office Action.
U.S. Appl. No. 10/651,303, Oct. 8, 2008, Office Action.
U.S. Appl. No. 10/651,303, May 1, 2009, Office Action.
U.S. Appl. No. 10/651,303, Nov. 27, 2009, Office Action.
U.S. Appl. No. 10/651,303, Mar. 11, 2011, Notice of Allowance.
U.S. Appl. No. 10/715,206, Sep. 27, 2007, Office Action.
U.S. Appl. No. 10/715,206, Jul. 25, 2008, Notice of Allowance.
U.S. Appl. No. 10/715,206, Jan. 27, 2009, Office Action.
U.S. Appl. No. 10/715,206, Aug. 13, 2009, Notice of Allowance.
U.S. Appl. No. 10/715,210, Sep. 27, 2007, Office Action.
U.S. Appl. No. 10/715,210, Apr. 14, 2008, Office Action.
U.S. Appl. No. 10/715,210, May 13, 2009, Office Action.
U.S. Appl. No. 10/715,210, Mar. 29, 2010, Notice of Allowance.
U.S. Appl. No. 10/715,211, Jul. 11, 2008, Office Action.
U.S. Appl. No. 10/715,211, Nov. 28, 2008, Office Action.
U.S. Appl. No. 10/715,211, Jun. 24, 2009, Office Action.
U.S. Appl. No. 10/715,211, Oct. 2, 2009, Notice of Allowance.
U.S. Appl. No. 10/715,211, Feb. 3, 2010, Office Action.
U.S. Appl. No. 10/715,211, Jul. 14, 2010, Office Action.
U.S. Appl. No. 10/715,211, Oct. 25, 2010, Notice of Allowance.
U.S. Appl. No. 10/715,213, Apr. 26, 2007, Office Action.
U.S. Appl. No. 10/715,213, Oct. 22, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,213, Aug. 6, 2009, Office Action.
U.S. Appl. No. 10/715,213, Jul. 18, 2013, Office Action.
U.S. Appl. No. 10/715,213, Dec. 6, 2013, Notice of Allowance.
U.S. Appl. No. 10/715,214, Apr. 20, 2007, Office Action.
U.S. Appl. No. 10/715,214, Oct. 9, 2007, Office Action.
U.S. Appl. No. 10/715,215, Mar. 23, 2007, Office Action.
U.S. Appl. No. 10/715,215, Aug. 20, 2007, Office Action.
U.S. Appl. No. 10/715,215, Nov. 20, 2010, Notice of Allowance.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/723,040, Mar. 14, 2006, Office Action.
U.S. Appl. No. 10/723,040, Jun. 26, 2006, Office Action.
U.S. Appl. No. 10/723,040, Jan. 4, 2007, Office Action.
U.S. Appl. No. 10/723,040, Jun. 4, 2007, Office Action.
U.S. Appl. No. 10/723,040, Oct. 25, 2007, Office Action.
U.S. Appl. No. 10/723,040, May 21, 2008, Notice of Allowance.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,263, Feb. 11, 2009, Notice of Allowance.
U.S. Appl. No. 10/747,263, Jun. 2, 2009, Notice of Allowance.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.
U.S. Appl. No. 10/747,678, Dec. 15, 2008, Office Action.
U.S. Appl. No. 10/747,678, Jun. 5, 2009, Notice of Allowance.
U.S. Appl. No. 10/747,678, Jun. 19, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/747,682, Mar. 18, 2009, Office Action.
U.S. Appl. No. 10/747,682, Nov. 2, 2009, Office Action.
U.S. Appl. No. 10/747,682, Jun. 11, 2010, Office Action.
U.S. Appl. No. 10/747,682, Dec. 2, 2010, Office Action.
U.S. Appl. No. 10/747,682, Oct. 5, 2011, Notice of Allowance.
U.S. Appl. No. 10/825,617, Jun. 24, 2008, Office Action.
U.S. Appl. No. 10/825,617, Mar. 9, 2009, Notice of Allowance.
U.S. Appl. No. 10/825,617, Sep. 10, 2009, Notice of Allowance.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/895,421, Nov. 19, 2008, Notice of Allowance.
U.S. Appl. No. 10/895,421, Apr. 17, 2009, Notice of Allowance.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Dec. 8, 2011, Office Action.
U.S. Appl. No. 11/023,652, Sep. 24, 2012, Office Action.
U.S. Appl. No. 11/023,652, Oct. 25, 2013, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Oct. 7, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 11/574,831, Sep. 18, 2009, Office Action.
U.S. Appl. No. 11/574,831, May 16, 2010, Office Action.
U.S. Appl. No. 11/574,831, Sep. 9, 2010, Office Action.
U.S. Appl. No. 11/574,831, Apr. 15, 2011, Office Action.
U.S. Appl. No. 11/574,831, Oct. 13, 2011, Notice of Allowance.
U.S. Appl. No. 12/236,255, Apr. 2, 2010, Office Action.
U.S. Appl. No. 12/236,255, Sep. 17, 2010, Office Action.
U.S. Appl. No. 12/236,255, Feb. 3, 2011, Office Action.
U.S. Appl. No. 12/548,338, Nov. 9, 2010, Office Action.
U.S. Appl. No. 12/548,338, May 19, 2011, Office Action.
U.S. Appl. No. 12/548,338, Dec. 9, 2011, Notice of Allowance.
U.S. Appl. No. 12/626,099, Sep. 17, 2010, Office Action.
U.S. Appl. No. 12/626,099, Mar. 30, 2011, Notice of Allowance.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Jun. 21, 2011, Office Action.
U.S. Appl. No. 13/023,256, Nov. 28, 2011, Office Action.
U.S. Appl. No. 13/023,256, Apr. 16, 2012, Office Action.

(56) References Cited

OTHER PUBLICATIONS

U.S. Appl. No. 13/023,256, Sep. 28, 2012, Office Action.
U.S. Appl. No. 13/023,256, Jun. 21, 2013, Office Action.
U.S. Appl. No. 13/023,256, Nov. 7, 2013, Office Action.
U.S. Appl. No. 13/048,312, Nov. 22, 2011, Office Action.
U.S. Appl. No. 13/048,312, Mar. 13, 2012, Notice of Allowance.
U.S. Appl. No. 13/184,414, Aug. 17, 2012, Notice of Allowance.
U.S. Appl. No. 13/184,414, Nov. 28, 2012, Notice of Allowance.
U.S. Appl. No. 13/184,414, Jan. 29, 2013, Notice of Allowance.
U.S. Appl. No. 13/189,972, Oct. 29, 2013, Office Action.
U.S. Appl. No. 13/189,972, Jul. 24, 2013, Office Action.
U.S. Appl. No. 13/189,972, Dec. 21, 2012, Office Action.
U.S. Appl. No. 13/189,972, Aug. 22, 2012, Notice of Allowance.
U.S. Appl. No. 13/189,972, May 7, 2012, Office Action.
U.S. Appl. No. 13/189,972, Jan. 5, 2012, Office Action.
U.S. Appl. No. 13/189,972, Sep. 2, 2011, Office Action.
U.S. Appl. No. 13/372,371, May 9, 2013, Office Action.
U.S. Appl. No. 13/372,371, Nov. 29, 2013, Office Action.
U.S. Appl. No. 13/507,429, Oct. 25, 2013, Office Action.
U.S. Appl. No. 13/614,640, Oct. 2, 2013, Office Action.
U.S. Appl. No. 13/614,640, Jan. 31, 2014, Office Action.
U.S. Appl. No. 13/614,781, Jun. 4, 2013, Office Action.
U.S. Appl. No. 13/614,781, Sep. 12, 2013, Office Action.
U.S. Appl. No. 13/614,781, Dec. 26, 2013, Office Action.
U.S. Appl. No. 13/617,270, Sep. 12, 2013, Office Action.
U.S. Appl. No. 13/617,330, Sep. 12, 2013, Office Action.
U.S. Appl. No. 13/619,009, Mar. 7, 2013, Office Action.
U.S. Appl. No. 13/619,009, Sep. 19, 2013, Office Action.
U.S. Appl. No. 13/619,036, Mar. 26, 2013, Office Action.
U.S. Appl. No. 13/619,036, Sep. 16, 2013, Office Action.
U.S. Appl. No. 13/619,054, Mar. 26, 2013, Office Action.
U.S. Appl. No. 13/619,054, Oct. 10, 2013, Office Action.
U.S. Appl. No. 13/620,851, Feb. 8, 2013, Office Action.
U.S. Appl. No. 13/620,851, Nov. 29, 2013, Office Action.
U.S. Appl. No. 13/620,853, Feb. 13, 2013, Office Action.
U.S. Appl. No. 13/620,853, Jan. 9, 2014, Office Action.
U.S. Appl. No. 13/620,856, Feb. 13, 2013, Office Action.
U.S. Appl. No. 13/620,856, Jan. 9, 2014, Office Action.
U.S. Appl. No. 13/361,141, Jan. 17, 2014, Office Action.
U.S. Appl. No. 13/729,318, Sep. 18, 2013, Office Action.
U.S. Appl. No. 13/729,318, Feb. 5, 2014, Office Action.
U.S. Appl. No. 13/731,124, Dec. 6, 2013, Office Action.
U.S. Appl. No. 13/755,990, Oct. 2, 2013, Office Action.
U.S. Appl. No. 13/755,990, Jan. 29, 2014, Office Action.
U.S. Appl. No. 13/766,775, Sep. 19, 2013, Office Action.
U.S. Appl. No. 13/766,781, Nov. 27, 2013, Office Action.
U.S. Appl. No. 13/766,785, Nov. 29, 2013, Office Action.
U.S. Appl. No. 13/766,786, Nov. 27, 2013, Office Action.
U.S. Appl. No. 13/766,779, Oct. 15, 2013, Office Action.
U.S. Appl. No. 13/614,781, Mar. 20, 2015, Office Action.
U.S. Appl. No. 13/620,862, Feb. 12, 2015, Office Action.
U.S. Appl. No. 13/620,863, Feb. 24, 2015, Office Action.
U.S. Appl. No. 13/620,865, Jan. 15, 2015, Office Action.
U.S. Appl. No. 13/372,371, Jul. 1, 2014, Notice of Allowance.
U.S. Appl. No. 13/614,781, Sep. 10, 2014, Office Action.
U.S. Appl. No. 13/620,862, Jul. 24, 2014, Office Action.
U.S. Appl. No. 13/620,863, Aug. 1, 2014, Office Action.
U.S. Appl. No. 13/620,865, Aug. 6, 2014, Office Action.
U.S. Appl. No. 13/731,124, Jun. 30, 2014, Office Action.
George Orwell, Nineteen Eighty-four (1st Mariner ed., 1949).
U.S. Appl. No. 13/620,863, Dec. 23, 2015, Notice of Allowance.
U.S. Appl. No. 13/620,865, Nov. 13, 2015, Office Action.
U.S. Appl. No. 13/372,371, Mar. 26, 2014, Office Action.
U.S. Appl. No. 13/507,429, Mar. 28, 2014, Office Action.
U.S. Appl. No. 13/617,650, Mar. 27, 2014, Office Action.
U.S. Appl. No. 13/619,009, Mar. 12, 2014, Notice of Allowance.
U.S. Appl. No. 13/619,036, Mar. 21, 2014, Office Action.
U.S. Appl. No. 13/766,775, Mar. 24, 2014, Office Action.
U.S. Appl. No. 13/023,256, Dec. 12, 2016, Notice of Allowance.
U.S. Appl. No. 13/023,256, Dec. 30, 2016, Notice of Allowance.
U.S. Appl. No. 13/620,865, Nov. 17, 2016, Office Action.

* cited by examiner

DYNAMIC LOCATION OF A SUBORDINATE USER

CROSS REFERENCE TO RELATED APPLICATION(S)

This is a continuation of U.S. application Ser. No. 11/574,831, filed Feb. 13, 2009 (now U.S. Pat. No. 8,122,137), which is a U.S. national stage application under 35 U.S.C. §371 of International Application No. PCT/US2004/029291, filed Sep. 8, 2004, all of which are expressly incorporated herein by reference in their entireties.

TECHNICAL FIELD

This invention relates to location of a subordinate user.

BACKGROUND

Communication technologies, such as mobile phones and the internet, have proliferated. As a result, children have ever greater freedom to move within the information world, and to do so from a variety of physical locations. Not all locations, however, are age appropriate, and the mobility and pervasiveness of communication technology may render impractical "eyes-on" supervision of the locations visited by a child or other user. "Eyes-on" supervision, moreover, generally reduces a child's sense of autonomy, and may require inordinate parental involvement.

SUMMARY

In one general aspect, providing location information to a supervisory user includes providing a parental control, using a computer automatically to determine a location of a subordinate user, and storing location information indicative of the location of the subordinate user in a database. A request of the supervisory user to locate the subordinate user is received and a user interface informs the supervisory user of the location of the subordinate user based on the stored location information. At least one of the storing and the informing are based on the parental control.

Implementations may include one or more of the following features. For example, providing the location information may include using the computer to determine a changed location of the subordinate user, using the database to update the stored location information based on the changed location, and using the user interface to inform the supervisory user of the changed location based on the updated stored location information. Informing the supervisory user of the changed location may include refreshing the information communicated by the user interface based on a predetermined interval.

Storing the location information may include storing an indication of the present location of the subordinate user. Location information indicative of past locations of the subordinate user also may be stored and the supervisory user may be informed of a past location of the subordinate user. The database may store the location information in relation to the subordinate user.

The supervisory user and the subordinate user may be associated through a familial relationship, and may hold related online accounts.

The parental control may include a white list indicative of an online location approved for visitation by the subordinate user and/or a black list indicative of an online location disapproved for visitation by the subordinate user. Providing location information may include informing the supervisory user of locations visited by the subordinate user that are included on the black list but not of locations that are included on the white list.

The parental control may indicate a range of location information of which the supervisory user desires to be informed. For example, the parental control may indicate that the supervisory user is to be informed of a predetermined number of the most recent locations visited by the subordinate user, of the locations most frequently visited by the subordinate user, and/or of the locations visited by the subordinate user within a defined period of time. The parental control also may include a textual analysis rule.

Determining the location of the subordinate user may include determining an online location and location information associated with the online location. The location information may include, for example, a universal resource locator (URL), an internet protocol (IP) address, and/or an identifier of an internet domain associated with the online location. The location information may include a television channel and/or an identification of a television program. The supervisory user may be enabled dynamically to access the online location of the subordinate user based on the location information.

Determining the location of the subordinate user also may include determining a physical location of the subordinate user, for example, based on information communicated by a global positioning system (GPS). Location information describing the physical location may include a physical address, a longitude and/or a latitude, and/or a name of a physical location.

The request of the supervisory user for information may include an identification (e.g., a screen name) of the subordinate user from a contact list of the supervisory user.

The supervisory user also may be enabled to communicate with the subordinate user in relation to a location visited by the subordinate user. The communication between the supervisory user and the subordinate may be enabled using an instant message, an email, a voice communication, and/or any other suitable electronic communication.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

An online service provider may enable an online user to determine dynamically and in real time the location of another user, such as, for example, a child or other subordinate user. For instance, the user may perceive a web page or URL presently viewed by the other user, a physical location of the other user, and/or a log of the past online activity of the subordinate user.

Figure 1:
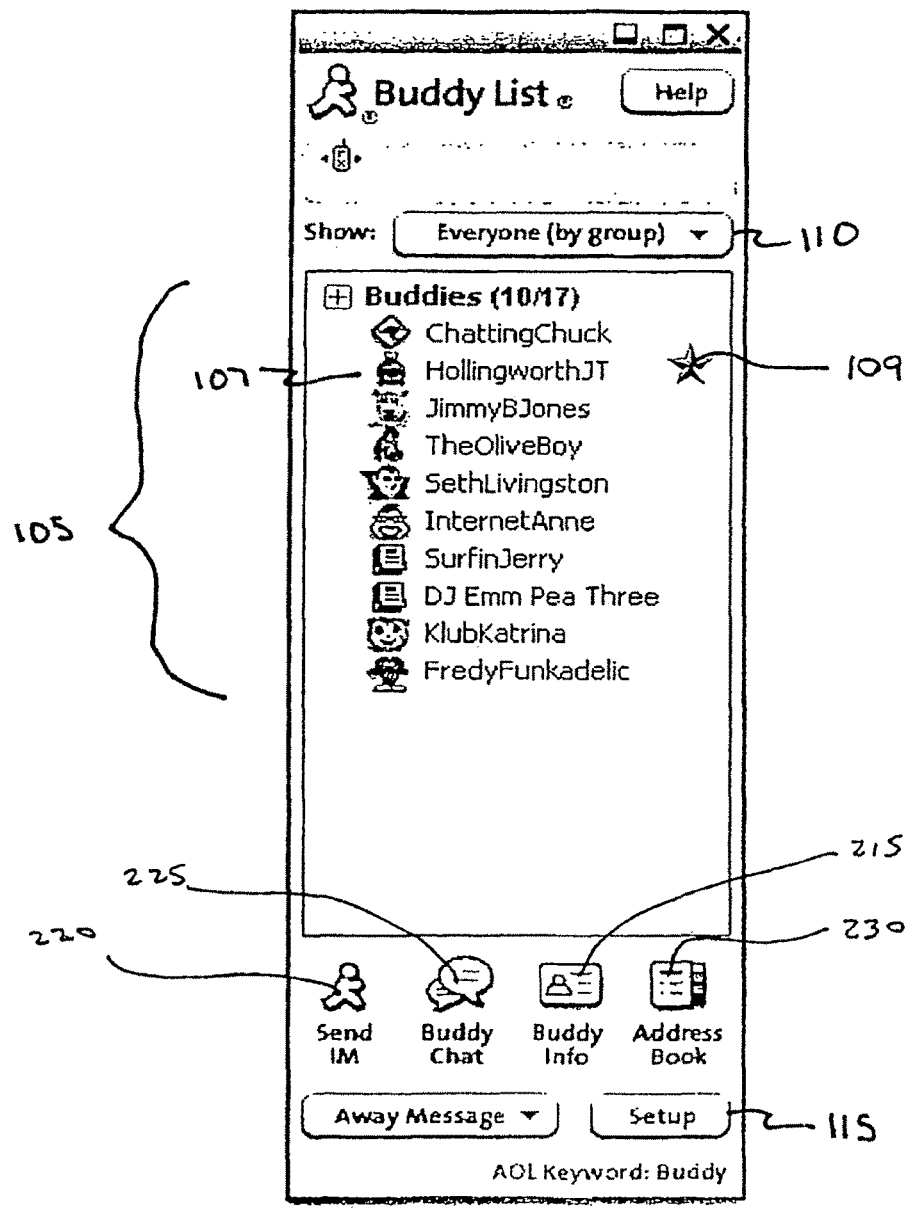
FIGS. 1-3 illustrate graphical user interfaces (GUIs) that may be used by a supervisory user to dynamically locate a subordinate user.

FIG. 1 illustrates a graphical user interface 100 (buddy list interface) that a supervisory user (e.g., a parent or guardian) may use to locate another user (e.g., a subordinate user such as a child). The buddy list interface 100 lists contacts 105 (e.g., buddies) of the supervisory user. The listed contacts may be identified to the supervisory user using textual and or graphical identifiers, such as, for example, a name (e.g., a screen name) and/or an icon. A subordinate user 107 may be identified from among the other contacts based on an additional identifier. For example, buddy list interface 100 uses a star icon 109 to the right of HollingworthJT to identify HollingworthJT as a subordinate user. In addition or as an alternative, other forms of identification may be used. For example, the subordinate user may be listed in a separate group (e.g., a subordinate user group or a family group), and/or the identifier of the subordinate user may be highlighted visually.

The supervisory user may use a button 110 (the "Show" button) to select between various formats for listing the subordinate user 107 and other contacts of the supervisory user. The supervisory user may use a button 115 (the "Setup" button) to control the location information that is gathered with respect to the subordinate user 107 and/or how that information is presented.

Figure 2:
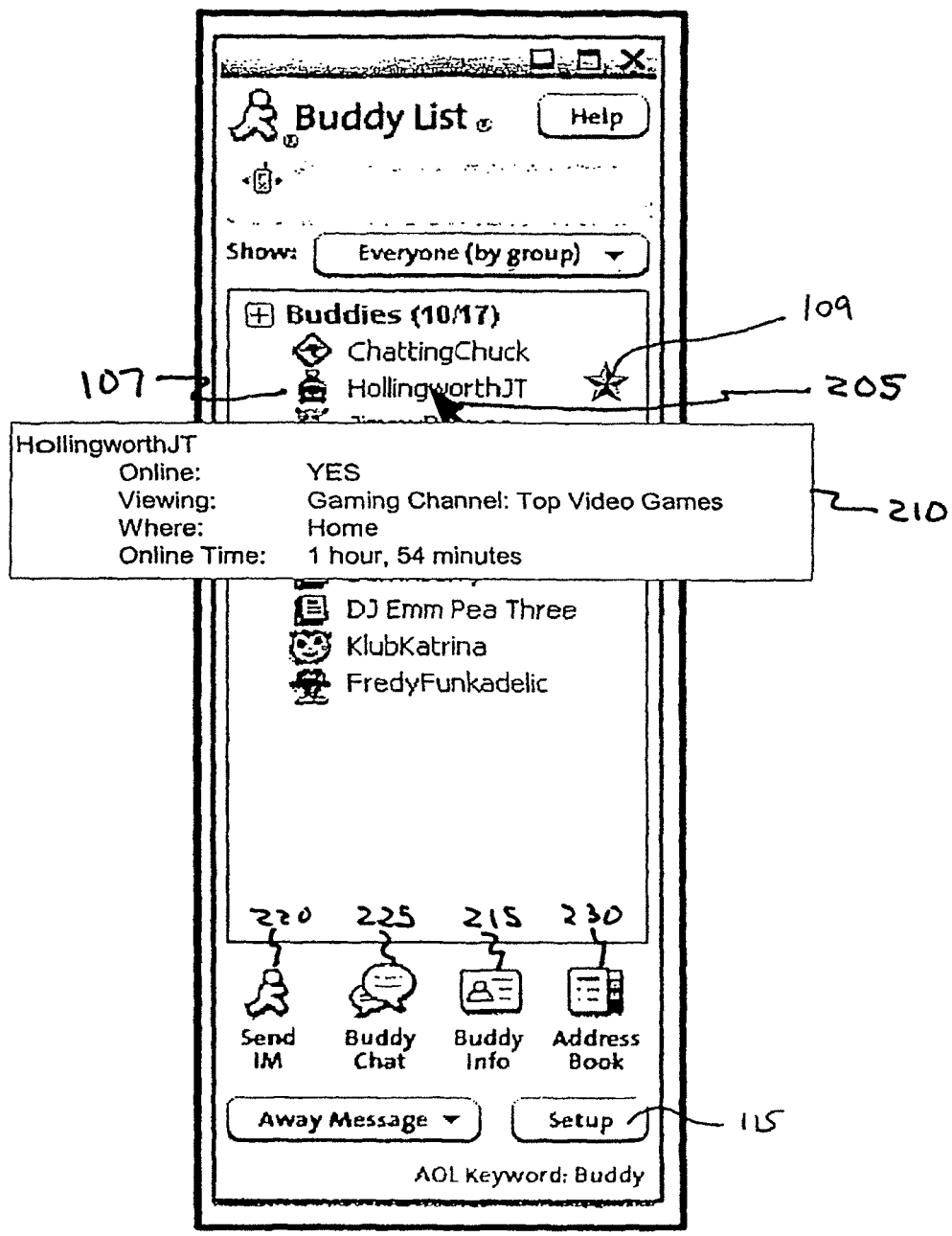

Referring to FIG. 2, the buddy list interface 100 enables the supervisory user to obtain information related to the subordinate user 107, such as, for example, location information. For instance, the supervisory user may pause or "float" a cursor 205 over the name of the subordinate user 107 to obtain a snapshot 210 of the subordinate user's location and online activity. As illustrated, the snapshot 210 indicates that HollingworthJT presently is online and is visiting "Top Ten Games" at the Games Channel. The snapshot 210 also indicates that HollingworthJT is at home and has been online for 1 hour and 54 minutes. More complete location information may be accessed by opening (e.g., by double clicking) the name of the subordinate user 107 or by using a button 215 (the "Buddy Info" button) after selecting (e.g., by single clicking) the name of the subordinate user 107.

In addition, the supervisory user may communicate with the subordinate user 107 or with another contact using a button 220 (the "Send IM" button) to initiate an instant message or a button 225 (the "Buddy Chat" button) to initiate a chat session. The supervisory user also may use a button 230 (the "Address Book" button) to add or modify contact information for the subordinate user 107 or for other contacts.

Figure 3:
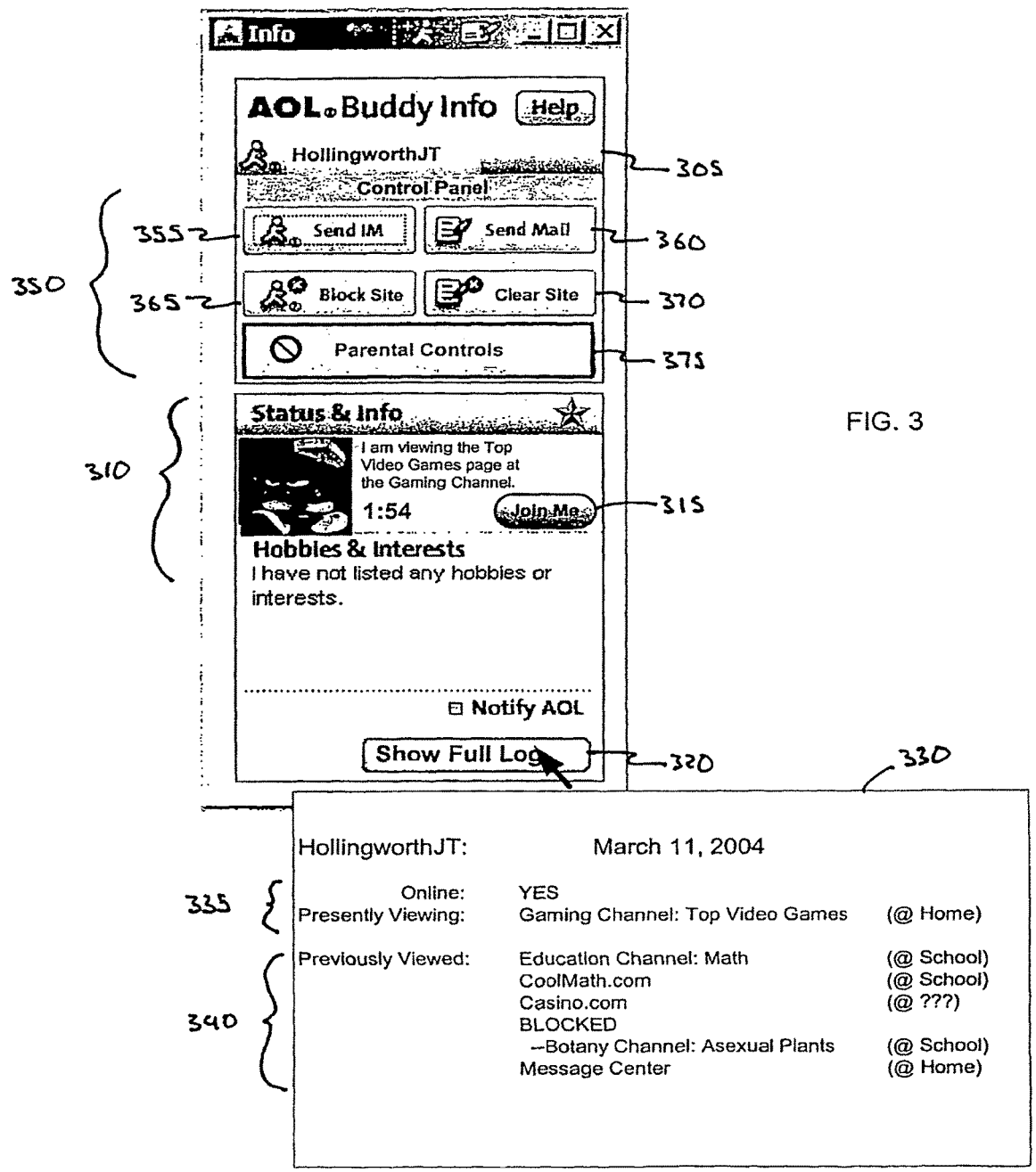

FIG. 3 illustrates a buddy info interface 300 that may be invoked from the buddy list interface 100 of FIG. 1 or based on an alert trigger, for example, of a parental control. The buddy info interface 300 shows or provides access to more complete location information related to the subordinate user 107. The buddy info interface 300 also may be invoked to obtain information related to the other listed contacts 105; however, the information for a particular contact 105 may be less detailed and/or subject to consent of the selected contact 105. Referring to FIG. 1, the buddy info interface 300 may be invoked, for example, by opening the name of the subordinate user 107 or by using the "Buddy Info" button 215 after selecting the name of the subordinate user 107.

Referring again to FIG. 3, the buddy info interface 300 includes an ID bar 305 that identifies the subordinate user 107 for whom information is provided. The buddy info interface 300 also includes an information panel 310 that indicates the current online location of the subordinate user 107. For example, the information panel 310 indicates that HollingworthJT presently is visiting the Top Ten Games page at the Gaming Channel and has been online for 1 hour and 54 minutes. The location information presented in the information panel 310 may be updated at predetermined intervals or dynamically as HollingworthJT moves to a different location. The supervisory user may use a button 315 (the "Join Me" button) to access the present online location of the subordinate user 107, such as, for example, to visit the web page, URL, or chat room presently accessed by the subordinate user 107.

Additionally, or in the alternative, the information panel 310 may indicate a physical location of the subordinate user 107. The physical location may be determined, for example, based on a known physical location of a non-mobile device (e.g., a workstation or a desk-top personal computer) or based on location information provided by a GPS (global positioning system) associated with a mobile device (e.g., a notebook computer, a personal digital assistant, or a mobile telephone) of the subordinate user 107.

The supervisory user may use a button 320 (the "Show Full Log" button) to access a location log (e.g., the location log 330 of the supervisory user 107, HollingworthJT) of present and past location information related to the subordinate user 107. The location log 330 may display location information according to a predetermined window. The window may define a predetermined period of interest, such as, for example, the past twenty-four hours, the current day (e.g., Mar. 11, 2004, as shown), the current week, or any other desired period of time. Other types of windows also may be used (e.g., to define a number of most recently or frequently visited locations).

As shown, the location log 330 indicates present location information 335 related to HollingworthJT (i.e., that HollingworthJT presently is online visiting the Gaming Channel from home). The location log 330 also indicates location information 340 from prior in the day. Specifically, the location log 330 shows that HollingworthJT visited the Math site at the Education channel and also CoolMath.com from school; that HollingworthJT visited the site Casino.com from an unknown location; that, while at school, HollingworthJT was blocked from accessing (e.g., based on an over-inclusive black list) a site on Asexual Plants at the Botany Channel; and that HollingworthJT visited the Message Center from home.

The supervisory user may use the information of the location log 330 to judge, for example, the appropriateness of locations visited by the subordinate user 107, and may use the control panel 350 to respond accordingly. For example, the supervisory user may use the location log 330 to note that HollingworthJT visited the site Casino.com and may determine that Casino.com is inappropriate for the subordinate user 107 to visit. Consequently, the supervisory user may use a button 355 (the "Send IM" button) or a button 360 (the "Send Mail" button) to communicate with the subordinate user regarding the location visited. Specifically, the supervisory user may communicate with HollingworthJT regarding the visit to Casino.com; and may wish to know why HollingworthJT was not at school then, and from where access was made. The supervisory user also may use a button 365 (the "Block Site" button) to block Casino.com from future access by HollingworthJT. In the alternative, the supervisory user may use a button 370 (the "Clear Site" button) to clear a site (e.g., the Asexual Plate site of the Botany Channel) that the supervisory user deems unobjectionable but for which the subordinate user 107 was blocked access.

The supervisory user also may use a button 375 (the "Parental Controls" button) to provide or modify a parental control used to supervise locations visited by the subordinate user 107. The parental control may include age-appropriate default settings that apply to different age classes of users, such as, for example, subordinate users classified as "Kids," "Young Teens," or "Mature Teens." The parental control may include one or more alert triggers that may cause the supervisory user to be quickly notified if the subordinate user visits a particular location or type of location.

The parental control also may include notification information to control delivery of the notification, for example, based on location information of the supervisory user. The location information, whether for a physical or an online location, may be determined similarly to the location of the subordinate user. In any event, the notification information and/or the location information may be used to select among several delivery mechanisms potentially available to the supervisory user. Delivery of the notification based on the location information enhances the likelihood that the notification is received by the supervisory user without significant delay.

In addition or in the alternative to the age-appropriate default settings, the parental control may include a white list defining approved locations (e.g., online educational sites, school, a friend's home) and/or a black list defining a domain of unacceptable locations (e.g., online gambling sites, a local pool hall, the home of a disapproved friend) for which visitation is disapproved. The white list and/or black list may be based on input of a rating authority or by a community of raters. The alert triggers may be used in conjunction with the white list and/or the black list. For example, an alert may indicate the arrival of the subordinate user to a white listed location (e.g., school or a friend's home). On the other hand, an alert also may be triggered when the subordinate user visits a black listed location. Although the white list or the black list may be provided initially as a default, the supervisory user may be enabled to modify or replace either the white list or the black list to better fit the supervisory user's preferences.

The parental control may include a time component used to supervise the times during which online access is permitted. For example, the supervisory user may restrict online access between the hours of 5:30 pm and 7:30 am during the school week, but may allow online access with less restriction in the afternoon after school, on the weekends while the subordinate user 107 is not at school, and during school with respect to school related activities. The time component of the parental control also may control the amount of time during a predetermined period (e.g., the present day, the present week, the preceding twenty-four hours) that the subordinate user 107 may access online sites. The alert triggers also may be used to generate a notification when the subordinate user disregards the time based parental controls.

The parental control may be used to control logging or reporting of the location of the subordinate user 107. The parental control may designate that all locations or only some locations visited by the subordinate user 107 are to be logged. The parental control may indicate that access to locations may be logged based, for example, on an approval status (e.g., based on a white list or a black list). Locations also may be logged based on a time constraint, such as, for example, whether the location is accessed at a non-approved time or is accessed for greater than an approved time. The parental control may indicate that logged locations are to be provided with an access time stamp and/or with an indication of the duration of access.

Figure 4:
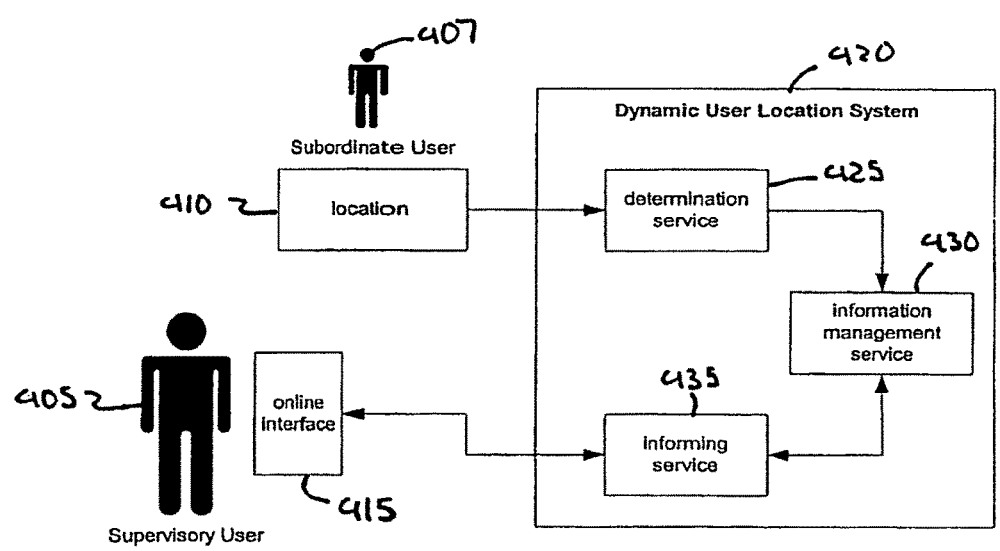
FIG. 4 is a schematic diagram of a system for dynamically locating a subordinate user.

FIG. 4 shows a generalized system 400 used to identify dynamically to a supervisory user 405 locations visited by a subordinate user 407. The supervisory user 405 and the subordinate user 407 may be related through a familial relationship (e.g., a parent-child relationship) and may hold related online accounts. In any event, the system 400 identifies the locations visited by the subordinate user 407 using a dynamic user location system 420. The dynamic user location system 420 includes a determination service 425, an information management service 430, and an informing service 435.

The determination service 425 may be configured to determine the location 410 (e.g., an online location and/or a physical location) of the subordinate user 407, and to communicate information indicative of the location 410. The location 410 may include an online location of the subordinate user 407, such as, for example, a location of the subordinate user 407 at a particular URL (uniform resource locator), chat-room, message board, or newsgroup. The location 410 also may include a physical location determined, for example, from GPS information of a mobile device, identification information (e.g., an internet protocol address, a phone number) of a fixed device having a known physical location, or location information maintained within a fixed or mobile device. The determination service 425 may employ one or more protocols to transfer information internally or to communicate with other components of the dynamic user location system 420.

The information management service 430 maintains information (e.g., present location, log information of past locations, time stamp information, parental control information, identification information and/or contact information) related to the subordinate user 407. The information management service 430 may modify or recharacterize location information obtained from the determination service 425 (e.g., using a map of online or physical location to determine generalized location information), for example, to enable presentation of the location information in a more useful form. In any event, based on the parental control information and/or system default information, the information management service 430 may store some or all of the location information and may manage that information in relation to an identifier of the subordinate user 407. Similarly, the information management service 430 may remove from storage some or all of the location information as indicated by the parental controls and/or system default information. Storing only the information required may improve scalability of the system 400. For example, based on a parental control, the information management service 430 may retain only location information that satisfies a predetermined window (e.g., that falls within a predetermined time period such as a rolling twenty-four hour period or the present week).

The informing service 435 is configured to interface between the supervisory user 405 and the information management service 430. For example, the informing service 435 may be configured to receive a request from the supervisory user 405 for location information related to the subordinate user 407. Based on the request, the informing service 435 is configured to query the information management service 430 for location information related to the subordinate user 407 and to communicate that information to the supervisory user 405, using, for example, the online interface 415. The online interface 415 may correspond generally to the GUIs described above with respect to FIGS. 1-3. The informing service 435 also may be configured as a conduit by which the supervisory user 405 may access and configure parental controls, and/or other control information or parameters maintained, for example, by the information management service 430.

The informing service 435 may enable the supervisory user 405 to communicate with the subordinate user 407, for example, in relation to the location information.

The informing service 435 also may enable the supervisory user 405 to modify the presentation of the location information related to the subordinate user 407 (e.g., to select among different views or detail levels of the location information as shown in FIGS. 1-3), to obtain related follow-on information, and/or to select or filter information based on various criteria (e.g., based on a selected time period or a specified parental control).

In determining or providing location information, the dynamic user location system 420 may control (or allow the supervisory user 405 to control) the resolution at which the location of the subordinate user 407 is determined or reported. The resolution control function may be performed individually or in combination by one or more of the determination service 425, the information management service 430 and/or the informing service 435.

For example, the determination service 425 may determine a specific location (e.g., a specific web page viewed or an exact longitude and latitude) of the subordinate user 407, but may report a more generalized location (e.g., the web site that includes the viewed page or the school that includes the exact longitude and latitude) that may be more useful to the supervisory user 405. Similarly, the information management service 430 may receive exact location information from the determination service 425, but may maintain generalized location information based on stored or accessed location mapping information. This generalized information may be maintained in addition to or as an alternative to the exact location information. In like manner, the informing service 435 may inform the user 405 of a generalized location that the informing service 435 has determined based on exact location information and location mapping information obtained from the information management service 430. Other functional allocations are possible.

The elements of system 400 may include additional mechanisms for delivering or processing data. The mechanisms may include, for example, any applications, protocols, devices, or networks used to facilitate communication or processing of electronic data. The system elements also may include or be included in a general-purpose or a special-purpose computer, a database, a local area network (LAN), and/or a wide area network (WAN). The response to and execution of instructions received by the system elements may be controlled, for example, by a program, a piece of code, an instruction, a device, a computer system, or a combination thereof, for independently or collectively instructing the system elements to interact and operate as described.

Figure 5:
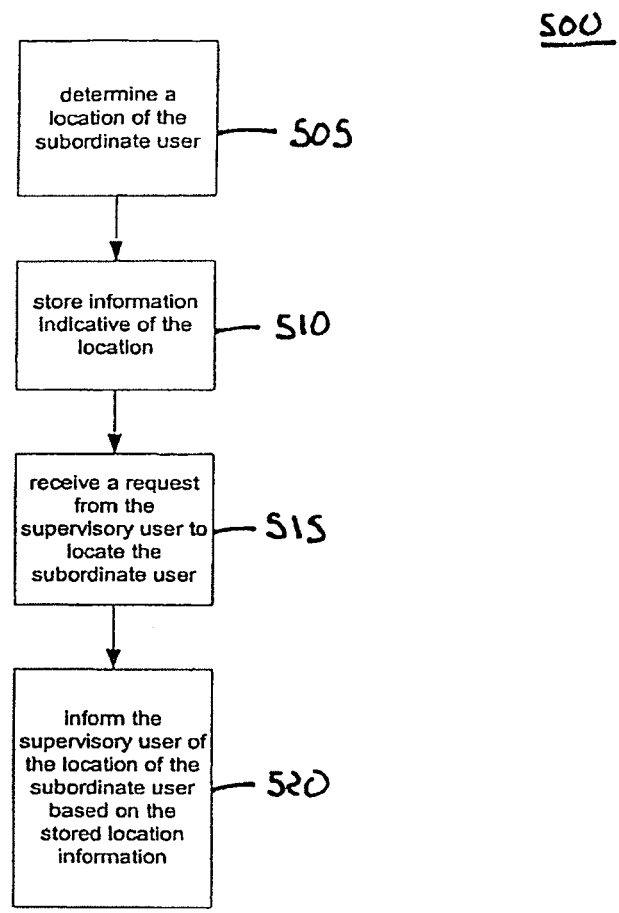
FIG. 5 is a flow diagram of a process implementable by the system of FIG. 5.

FIG. 5 illustrates a flow diagram of a process 500 implementable by system 400 of FIG. 4 to identify dynamically to the supervisory user 405 a location of the subordinate user 407. The determination service 425 determines a location (e.g., an online location or a physical location) of the subordinate user 407 (step 505). The information management service 430 stores information indicative of the location of the subordinate user 407 using, for example, a database record associated with the subordinate user 407 (step 510). The informing service 435 receives a request from the supervisory user 405 to locate the subordinate user 407 (step 515). The informing service 435 then informs the supervisory user 405 of the location of the subordinate user 407 based on the stored location information. The informing service 435 may inform the supervisory user 405 using, for example, a pop-up window, a list, a graph, or any other appropriate mechanism. The informing service 435 may inform the supervisory user 405 of the location of the subordinate user 407 in a fashion suitable to enable the supervisory user 405 to communicate (e.g., in real time) with the subordinate user 407.

Figure 6:
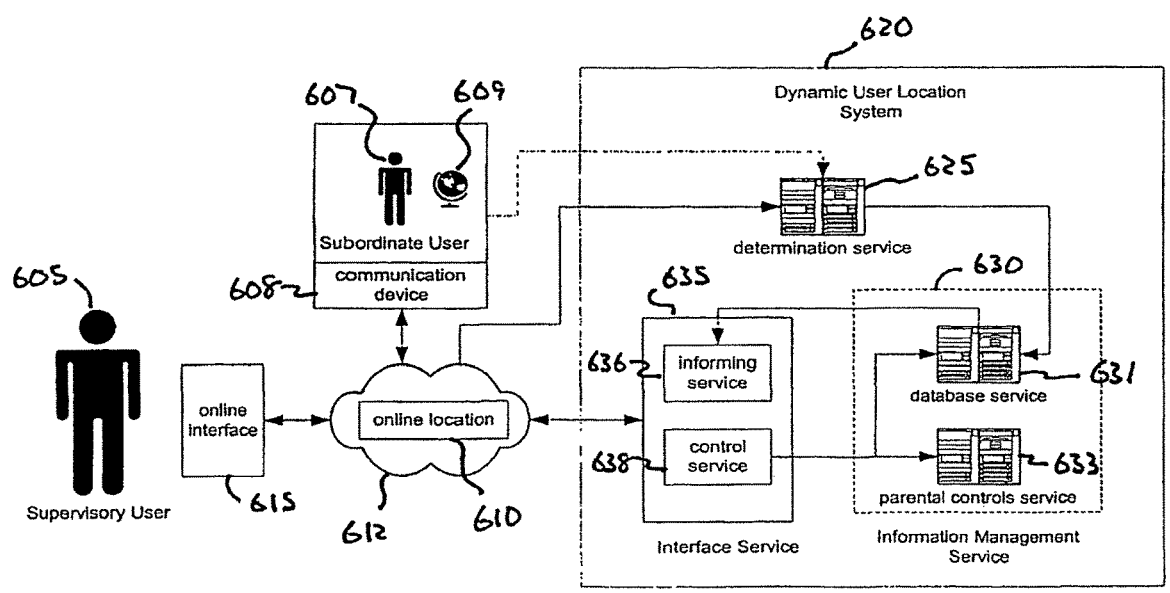
FIG. 6 is a schematic diagram of a user location system.

Referring to FIG. 6, a generalized system 600 identifies dynamically to a supervisory user 605 a location of a subordinate user 607. To this end, the system 600 uses a dynamic user location system 620 having a determination service 630, an information management service 630, and an interface service 635. Components of the location system 600 are described in greater detail below.

The subordinate user 607 may use a communication device 608 at a physical location 609 to visit an online location 610 included within a network 612. The communication device 608 may be configured to provide the subordinate user 607 with online access to the network 612. More generally, the communication device 608 may include any device, system, and/or piece of code that enables the subordinate user 607 to communicate with another device or service. For example, the communication device 608 may include a device such as a notebook computer, a telephone, a pen-enabled computer, a personal digital assistant (PDA), a mobile telephone, and/or a desktop computer. Components of the communication device 608 may include a global positioning system (GPS), a Web browser, an email client, a synchronization client (e.g., a calendar synchronization client or a task list synchronization client), an instant messaging (IM) client, a business productivity application (e.g., a word processing or spreadsheet program), and/or an operating system or operating system kernel residing on a device. The communication device 608 may be arranged to operate within or in concert with one or more other systems, such as, for example, one or more LANs and/or one or more WANs.

The network 612 (e.g., the internet) typically allows direct or indirect communication between the communication device 608 and the dynamic user location system 620, irrespective of physical or logical separation. The network 612 also may allow direct or indirect communication between the supervisory user 605 and the dynamic user location system 620, and between the supervisory user 605 and the subordinate user 607. The network 612 may access or include various sources of information, such as, for example, third party information or services, email, a discussion group, a chat room, a news service, a broker service, a banking service, a shopping service, a weather service, the World Wide Web, or other internet information sources.

The network 612 may employ one or more protocols (i.e., standards, formats, conventions, rules, and structures) to transfer information internally or deliver information to one or more users. The protocols may include, for example, the internet protocol (IP), the transmission control protocol (TCP), the hypertext transfer protocol (HTTP), the file transfer protocol (FTP), the user datagram protocol (UDP), the layer two tunneling protocol (L2TP) and/or the simple mail transfer protocol (SMTP). The network 612 may include, for example, the internet, the World Wide Web, a WAN, a LAN, analog or digital wired and wireless telephone networks (e.g., PSTN, ISDN, or xDSL), radio, television, cable, satellite, and/or any other delivery mechanism for carrying data. The network 612 may be secured or unsecured, public or private.

The dynamic user location system 620 may enable the supervisory user 605 to interact online with the subordinate user 607, and to do so, for example, by using instant messaging or email. The dynamic user location system 620 also may enable the supervisory user 605 to interact with the subordinate user 607 using a voice communication provided, for example, using a wireless mobile device. The dynamic user location system 620 allows the supervisory user 605 to view present and past locations of the subordinate user 607 so that the supervisory user 605 may determine the desirability of or need for communicating with the subordinate user 607.

In one implementation, the dynamic user location system 620 works to identify a television program viewed by the subordinate user 607. The dynamic user location system 620 may enable the supervisory user 605 to join the subordinate user 607 in viewing the television program and/or to interact during the television program with the subordinate user 607, using, for example, instant messaging and/or any other appropriate form of electronic messaging. The ability to interact dynamically and in real time with the subordinate user 607 (e.g., a child) may significantly enhance the real and perceived value of television programming by aiding parents, perhaps while away from their children, to participate in or monitor their children's viewing experience.

The dynamic user location system 620 includes a determination service 625 to determine dynamically the locations (e.g., online and/or physical) of the subordinate user 607. To make this determination with respect to online location 610, the determination service 625 may monitor dynamically the online activities of the subordinate user 607, such as, for example, the opening of a Web page of the network 612, focus upon an opened web page (e.g., by clicking on an open Web page or a portion thereof), and/or entry into a chat room or a news group. With respect to the physical location 609, the determination service 625 may obtain location information from a GPS of the communication device 608. The determination service 625 also may determine physical location 609 from location information stored by communication device 608 and/or based on location information accessed by the determination service 625 in relation to an identifier of the communication device (e.g., an internet protocol address, a phone number, an area code or a screenname). Having determined physical location information related to the subordinate user 607, the determination service 625 may communicate that information to the information management service 630.

The information management service 630 is similar generally to the information management service 430 of FIG. 4. To manage information related to the subordinate user, the information management service 630 may include and/or access a database service 631 and a parental control service 633. The database service 631 may include a database, such as, for example, a relational database, for storing or referencing information related to online and/or physical locations visited by the subordinate user 607. In general, the location information includes information, such as, for example, an identification of a physical location (e.g., a longitude and latitude, an address, a neighborhood or a town or city) and/or an online location (e.g., a URL, a web site, a chat room or a news group). The database service 631 also may store or reference notification information or information identifying a physical and/or online so location of the supervisory user to provide notifications to the supervisory user in response to alert triggers.

The location information may identify a location based on a hierarchical relationship. For example, the location information may identify as within the same location an online news site and web pages hierarchically associated with that site, or a television channel and programming associated with that channel.

In any event, the database service 631 may add or remove location information from the database in view of parental controls and/or system defaults. For example, the database service 631 may record only locations that have been visited but that have not been pre-approved (e.g., through the parental controls based on a white list). The database service 631 also may remove from the database (e.g., allow to be overwritten by the database) information that was stored previously but that relates to locations visited outside of a designated interest window (e.g., information relating to a location visited 48 hours ago when the window of interest is the preceding 24 hours).

The parental controls service 633 may enable parental controls similar to those accessed using the "Parental Controls" button 375 of FIG. 3. In general, the parental controls service 633 may be configured to allow a parent (e.g., the supervisory user 605) to control the monitoring of the locations visited by a child (e.g., the subordinate user 607). The parental controls service 633 also may enable a parent to establish or configure alert triggers in order to receive notifications based on compliance or non-compliance with the parental controls. The parental controls service 633 may employ a white list and/or a black list, as described relative to button 375 of FIG. 3, and the parent may be enabled to modify the white list or the black list. For example, the parent may decide to remove from a black list a Tom and Jerry® cartoon web site placed on the black list because of cartoon violence.

The parental controls service 633 may be configured to permit the supervisory user 605 to define a window of location information of which the supervisory user 605 wishes to be informed. For example, the supervisory user 605 may specify a time window that is either fixed (e.g., Mar. 13, 2004) or moving (e.g., the last 24 hours) for which the supervisory user 605 desires location information. The supervisory user 605 also may specify a numerical window that indicates a desire for location information regarding a specified number of the locations most recently visited and/or most frequently visited (e.g., the ten locations most recently or frequently visited) by the subordinate user 607.

The parental controls service 633 may screen a location based upon an analysis of text and/or a label associated with the location. For example, the parental controls service 633 may analyze the language of an online site to determine whether the online site includes inappropriate subject matter. Textual analysis may indicate, for instance, that visits to an online site should be reported because the online site relates to gambling (e.g., based on language that includes "gambling," "sportbook," "jackpot," "casino," "bonus," "bingo," "roulette," "odds," "house," and/or "blackjack"). In another example, a physical location may be identified for reporting as a pool hall based on an associated label including the term "billiards." In addition, or in the alternative, the location label may include an express identification of the age appropriateness of the location. The parental controls service 633 may enable a child's parent to select or modify the information or algorithms used to screen the locations based on the textual analysis.

The parental controls service 633 additionally may enable the parent to place a time based restriction on the child's visit to a location. For example, a visit to a friend's home may be restricted during school or homework hours, or visits to online locations may be restricted to no more than forty-five minutes a day. Other recognized control techniques also may be applied by the parental controls service 633.

The database service 631 and the parental controls service 633 may or may not be incorporated within the same hardware and/or software device, depending, for example, on an anticipated workload of the information management service 630. Structuring the information management service 630 to include a separable database service 631 and parental controls service 633 may improve the scalability of the information management service 630.

The dynamic user location system 620 also includes an interface service 635. The interface service 635 communicates between the supervisory user 605 and the information management service 630. The interface services 635 may include a print service, a file access service, an IM service, an operating system, an operating system kernel, an authentication service, an authorization service, and/or any combination of these or other services.

More specifically, the interface service 635 includes an informing service 636 and a control service 638 to communicate between the supervisory user 605 and the information management service 630. The control service 638 is configured to communicate requests, instructions, and/or configuration information from the supervisory user 605 to the information management service 630. For example, the control service 638 may be configured as a conduit by which the supervisory user 605 may access and configure parental controls and/or other control information or parameters maintained, for example, by the parental controls service 633 of the information management service 630. The supervisory user 605 also may use the control service 638 to query the database service 631 for location information related to the subordinate user 607.

The informing service 636 is configured to communicate information from the information management service 630 to the supervisory user 605. For example, in response to a query provided through the control service 638, the informing service 636 may communicate to the supervisory user 605 the current parental control configuration and/or system defaults maintained by the parental controls service 633. The informing service 636 also may communicate to the supervisory user 605 location information of the subordinate user 607 provided by the database service 631. The informing service may use the online interface 615 as a conduit to communicate information to the supervisory user 605.

The online interface 615 may correspond generally to the GUIs described with respect to FIGS. 1-3. For example, the online interface 615, alone or in conjunction with the interface service 635, may enable the supervisory user 605 easily to communicate with the subordinate user 607 in relation to the location information or otherwise. The supervisory user 605 may be enabled to modify the presentation of the location information related to the subordinate user 607 (e.g., to select among different views or detail levels of the location information as shown in FIGS. 1-3), to obtain related follow-on information, and/or to select or filter information based on various criteria (e.g., based on a selected time period or a specified parental control).

The online interface 615 may receive location information from the dynamic user location system 620 based on a query of the online interface 615. The online interface 615 also may receive location information from the dynamic user location system 620 automatically after a change in the subordinate user's location and/or at any time that the logged location information changes. For example, the online interface 615 may receive updated location information at short periodic intervals, such as, for example, every 30 or 60 seconds. In any event, the online interface 615, alone or in conjunction with the dynamic user location system 620, may perform sorting, prioritizing, or other types of organizational processing on the location information presented to the supervisory user 605 so that the location information is provided in a desired fashion. Typically, the online interface 615 and/or the dynamic user location system 620 will include a software program or a piece of code to cause the operation described above.

The online interface 615 may receive and present information to the supervisory user 605 using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), the short message service (SMS), a document object model (DOM), the simple object access protocol (SOAP), or the dynamic hypertext markup language (DHTML). The online interface 615 may present the information to the supervisory user 605 in a manner that enables the supervisory user 605 to respond to, or to interact with, the presented information.

The dynamic user location system 620 may optionally be incorporated within the same hardware or software device, depending, for example, on an anticipated workload. The dynamic user location system 620 also may be implemented in a logically or physically distributed fashion to improve maintainability, cost, and/or scalability.

Each of the communication device 608, the online interface 615, the network 612, and the dynamic user location system 620 may include further mechanisms for communicating data, such as, for example, the short message service (SMS), the wireless application protocol (WAP), the transport connection protocol (TCP), the internet protocol (IP), the World Wide Web, one or more LANs, and/or one or more WANs. The communication device 608, the online interface 615, the network 612, and the dynamic user location system 620 also may include analog or digital wired and wireless communications networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying data.

One or more other services may be included in the components of system 600 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a local area network, and/or a wide area network. In either case, the response to and execution of instructions received by any or all of the system services may be controlled by, for example, a program, a piece of code, an instruction, a device, a computer system, or a combination thereof, for independently or collectively instructing the services to interact and operate as described herein.

Figure 7A:
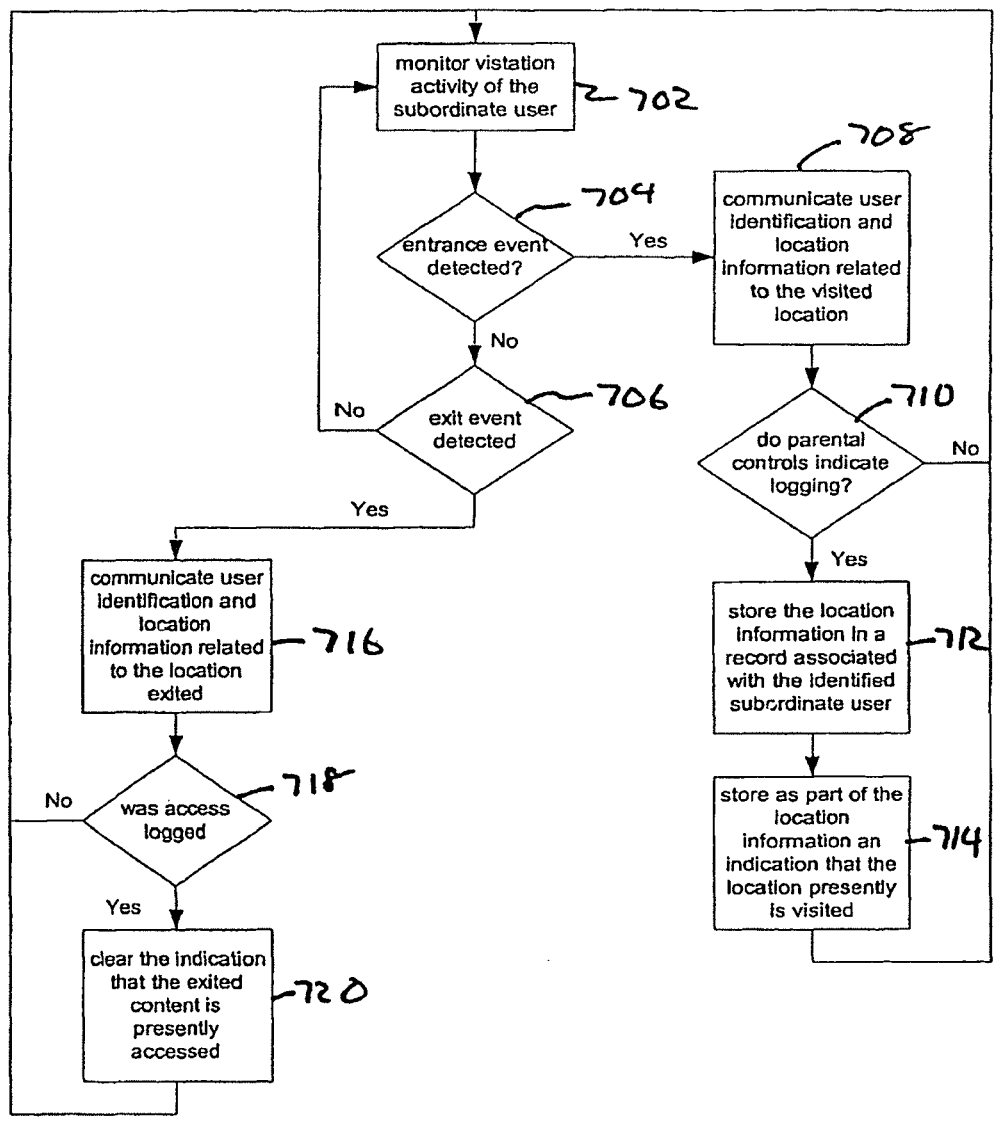
FIGS. 7A-7C are flow diagrams illustrating exemplary processes implementable by the user location system of FIG. 6.
Figure 7B:
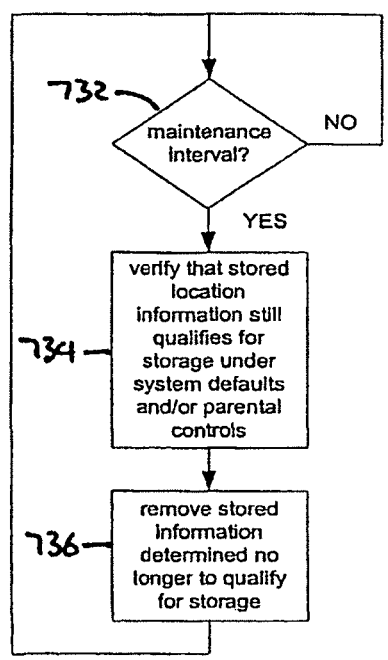
Figure 7C:
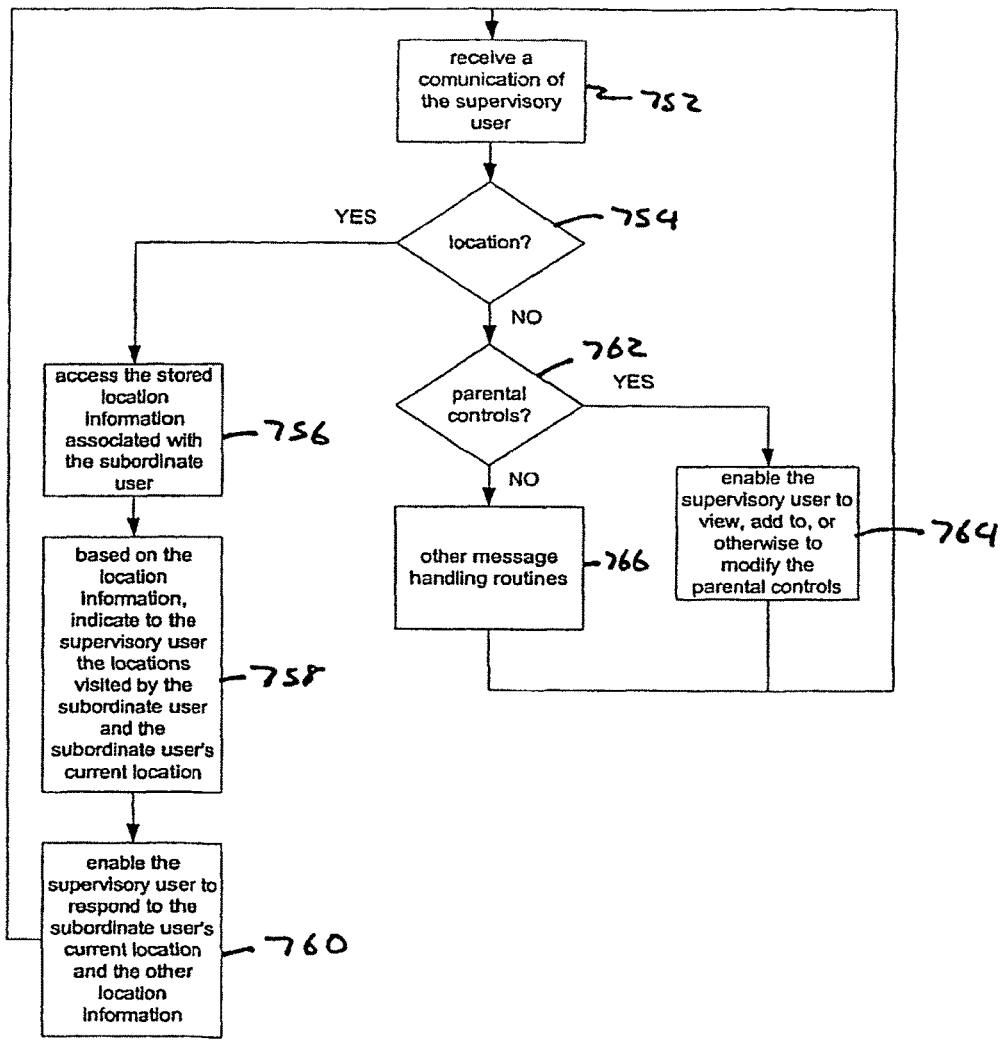

FIGS. 7A-7C illustrate a method implementable by the dynamic user location system of FIG. 6. The method includes a logging procedure 700 (FIG. 7A) used to monitor the visitation activity of the subordinate user, a maintenance procedure 730 (FIG. 7B) used to maintain stored location information, and an interface procedure 750 (FIG. 7C) used to communicate with the supervisory user. The logging, maintenance, and interface procedures may be performed asynchronously and/or concurrently to each other.

Referring to the logging procedure 700 of FIG. 7A, visitation activity of the subordinate user 607 is monitored for entrance or exit events (step 702). Monitoring continues as long as neither an entrance event nor an exit event is detected (steps 704 and 706).

If an entrance event (e.g., entry into a physical location, opening of an online location, focusing on an online location) is detected (step 704), then a user identification and location information related to the visited location is communicated (step 708). If the parental controls and/or system defaults do not indicate that logging is required (step 710), then monitoring of the subordinate user's visitation activity resumes (step 702). Otherwise, if logging is required (step 710), then the location information is stored in a database record associated with the subordinate user to indicate that the subordinate user has visited the location (step 712). An indication also is stored that the location is the present location of the subordinate user (step 714). Thereafter, monitoring resumes (step 702).

In the event that an exit event is detected (step 706), the user identification and location information related to the location exited is communicated (step 716). If the subordinate's user's visit to the location was logged (step 718) then the indication that the subordinate user presently is at that location is cleared (step 720). Thereafter, or if the visit to the exited location was not logged (step 718), monitoring of the subordinate user's visitation activity resumes (step 702). Multiple steps may be performed concurrently.

Referring to FIG. 7B, the maintenance procedure 730 is performed upon a predetermined or automatically determined maintenance interval (step 732). In accordance with the maintenance interval, verification is made that stored location information still qualifies for storage based on the system defaults and/or parental controls (step 734). Verification may include, for example, ensuring that the stored location information continues to satisfy a moving window of interest indicated by the parental controls (e.g., that the location information relates to a visit made within 48 hours of the present time). In any event, stored information that fails presently to satisfy the system defaults and/or parental controls may be removed or purged (step 736). Multiple steps may be performed concurrently.

Referring to the interface procedure 750 of FIG. 7C, a communication of the supervisory user is received (step 752). If the communication is a request for location information (step 754), then stored location information associated with the subordinate user is accessed (step 756). The subordinate user's present location and/or other locations visited by the subordinate user are presented to the supervisory user based on the logged location information (step 758). In addition, the supervisory user may be enabled to act based on the presented location information (step 760). For example, the supervisory user may be enabled to communicate (e.g., via email, instant message, or mobile device) with the subordinate user based on or in relation to a location visited by the subordinate user. In the case of an online location, the supervisory user may be enabled further to join the subordinate user at a present online location or to access past locations visited by the subordinate user.

On the other hand, if the communication is for access to the parental controls (step 762), then the supervisory user may be enabled to view, add to, or otherwise modify the parental controls as desired (step 764). For example, the supervisory user may be enabled to modify or replace either a white list or a black list, to add or modify a time component, and/or to otherwise control or specify logging criteria to control storage or access to location information related to the subordinate user.

For messages of other types (i.e., not relating to a location request or to parental controls), other message handling routines may be employed as appropriate (step 766). In any event, irrespective of the message type received and handled, monitoring continues for other communications of the supervisory user (step 752). Multiple steps may be performed concurrently.

Other implementations are within the scope of the following claims.

What is claimed is:

1. A method comprising:
receiving, at a client computing device, from an account of a first user, a request to monitor online locations of a second user accessed using a mobile device of the second user while at a geographic location;
receiving a black list indicative of one or more online locations disapproved for visitation by the second user while at the geographic location;
monitoring, by the client computing device, online locations accessed by the mobile device of the second user while at the geographic location;
providing, to the first user via a graphical user interface associated with the account of the first user, a listing of recent online locations accessed by the mobile device of the second user while at the geographic location; and
providing, via the graphical user interface and in conjunction with the listing of recent online locations, an option to add one or more of the recent online locations to the black list.

2. The method of claim 1, wherein the one or more online locations on the black list are approved for visitation by the second user when at locations other than the geographic location.

3. The method of claim 1, wherein the geographic location comprises at least one of a physical address, latitude and longitude, or a name associated with a physical location.

4. The method of claim 1, wherein the online location comprises at least one of a domain name or a URL address.

5. The method of claim 1, further comprising:
providing an indication of the mobile device used by the second user to access the at least one disapproved online location.

6. The method of claim 1, wherein the online location comprises at least one of a television channel or a television program identification.

7. The method of claim 1, further comprising: enabling the first user to access the online location of the second user.

8. The method of claim 1, further comprising:
receiving a selection of the option to add one or more of the recent online locations to the black list; and
preventing the mobile device from accessing the one or more of the recent online locations while at the geographic location.

9. A non-transitory computer-readable medium having stored thereon executable instructions that, when executed by at least one processor, cause the at least one processor to:
receive, from an account of a first user, a request to monitor online locations of a second user accessed using a mobile device of the second user while at a geographic location;
receive a black list indicative of one or more online locations disapproved for visitation by the second user while at the second location;
monitor online locations accessed by the mobile device of the second user while at the geographic location;
provide, to the first user via a graphical user interface associated with the account of the first user, a listing of recent online locations accessed by the mobile device of the second user while at the geographical location; and
provide, via the graphical user interface and in conjunction with the listing of recent online locations, an option to add one or more of the recent online locations to the black list.

10. The computer-readable medium of claim 9, wherein the one or more online locations on the black list are approved for visitation by the second user when at locations other than the geographic location.

11. The computer-readable medium of claim 9, wherein the geographic location comprises at least one of a physical address, latitude and longitude, or a name associated with a physical location.

12. The computer-readable medium of claim 9, wherein the online location comprises at least one of a domain name or a URL address.

13. The computer-readable medium of claim 9, wherein the instructions, when executed by the at least one processor, further cause the at least one processor to: provide an indication of the mobile device used by the second user to access the at least one disapproved online location.

14. The computer-readable medium of claim 9, wherein the online location comprises at least one of a television channel or a television program identification.

15. The computer-readable medium of claim 9, wherein the instructions, when executed by the at least one processor, further cause the at least one processor to: enable the first user to access the online location of the second user.

16. The computer-readable medium of claim 9, wherein the instructions, when executed by the at least one processor, further cause the at least one processor to:
receive a selection of the option to add one or more of the recent online locations to the black list; and
prevent the mobile device from accessing the one or more of the recent online locations while at the geographic location.

17. A system for monitoring and providing information comprising:
a processor; and
a memory, wherein the memory stores instructions that, when executed by the processor, cause the system to:
receive, from an account of a first user, a request to monitor online locations of a second user accessed using a mobile device of the second user while at a geographic location;
receive a black list indicative of one or more online locations disapproved for visitation by the second user while at the geographic location;
monitor online locations accessed by the mobile device of the second user while at the geographic location;
provide, to the first user via a graphical user interface associated with the account of the first user, a listing of recent online locations accessed by the mobile device of the second user while at the geographic location; and
provide, via the graphical user interface and in conjunction with the listing of recent online locations, an option to add one or more of the recent online locations to the black list.

18. The system of claim 17, wherein the one or more online locations on the black list are approved for visitation by the second user when at location other than the geographic location.

19. The system of claim 17, wherein the geographic location comprises at least one of a physical address, latitude and longitude, or a name associated with a physical location.

20. The system of claim 17, wherein the online location comprises at least one of a domain name or a URL address.

21. The system of claim 17, wherein the memory further stores instructions that, when executed by the processor, cause the system to: provide an indication of the mobile device used by the second user to access the at least one disapproved online location.

22. The system of claim 17, wherein the online location comprises at least one of a television channel or a television program identification.

23. The system of claim 17, wherein the memory further stores instructions that, when executed by the system, cause the processor to: enable the first user to access the online location of the second user.

24. The system of claim 17, wherein the memory further stores instructions that, when executed by the system, cause the processor to:
receive a selection of the option to add one or more of the recent online locations to the black list; and
prevent the mobile device from accessing the one or more of the recent online locations while at the geographic location.

* * * * *